US012679683B2

(12) United States Patent
Isoda et al.

(10) Patent No.: US 12,679,683 B2
(45) Date of Patent: Jul. 14, 2026

(54) DOCUMENT CONVEYING DEVICE

(71) Applicant: KYOCERA Document Solutions Inc., Osaka (JP)

(72) Inventors: Ren Isoda, Osaka (JP); Yoshitaka Tokoro, Osaka (JP); Takafumi Nakagawa, Osaka (JP); Shikitaro Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/056,643

(22) Filed: Feb. 18, 2025

(65) Prior Publication Data

US 2025/0270063 A1 Aug. 28, 2025

(30) Foreign Application Priority Data

Feb. 28, 2024 (JP) .................................. 2024-028714

(51) Int. Cl.
B65H 7/14 (2006.01)
B65H 1/04 (2006.01)
(Continued)

(52) U.S. Cl.
CPC ................. B65H 7/14 (2013.01); B65H 1/04 (2013.01); B65H 1/08 (2013.01); B65H 1/14 (2013.01);
(Continued)

(58) Field of Classification Search
CPC ... B65H 7/14; B65H 1/04; B65H 1/08; B65H 1/12; B65H 1/14; B65H 2405/1132;
(Continued)

(56) References Cited

U.S. PATENT DOCUMENTS

| | | | | |
|---|---|---|---|---|
| 2007/0092318 A1* | 4/2007 | Tabuchi | ............... | G03G 15/602 |
| | | | | 399/367 |
| 2010/0225045 A1* | 9/2010 | Kimura | ............... | B65H 3/0684 |
| | | | | 271/10.09 |
| 2023/0391567 A1* | 12/2023 | Nakagawa | ............... | B65H 1/14 |

FOREIGN PATENT DOCUMENTS

| | | |
|---|---|---|
| JP | 2019131351 A | 8/2019 |
| JP | 2023-176933 A | 12/2023 |

OTHER PUBLICATIONS

The extended European search report issued by the European Patent Office on Jul. 25, 2025, which corresponds to European Patent Application No. 25159548.4-1014 and is related to U.S. Appl. No. 19/056,643.

* cited by examiner

*Primary Examiner* — Jeremy R Severson
(74) *Attorney, Agent, or Firm* — Studebaker Brackett PLLC

(57) ABSTRACT

A document conveying device includes a sheet feeding tray, a sheet feeding mechanism, a sheet feeding tray lifting mechanism, a top plate, a fixed wall part, a lifting wall part, and a reflective optical sensor. The top plate is in contact with a lower surface of the document to be fed. The fixed wall part is provided extending downward from an upstream side end portion of the top plate, and is fixed in position. The lifting wall part is provided extending upward from a downstream side end portion of the sheet feeding tray, and lifted and lowered along the fixed wall part together with the sheet feeding tray. The reflective optical sensor detects the document placed on the sheet feeding tray. The reflective optical sensor emits light in a direction inclined downstream of the sheet feeding direction from a vertically upward direction.

4 Claims, 17 Drawing Sheets

(51) Int. Cl.

| | |
|---|---|
| *B65H 1/08* | (2006.01) |
| *B65H 1/14* | (2006.01) |
| *B65H 3/06* | (2006.01) |
| *H04N 1/00* | (2006.01) |
| *H04N 1/12* | (2006.01) |

(52) U.S. Cl.

CPC ............. *B65H 3/06* (2013.01); *B65H 3/0684* (2013.01); *H04N 1/00734* (2013.01); *B65H 2301/42324* (2013.01); *B65H 2405/1132* (2013.01); *B65H 2405/1134* (2013.01); *B65H 2405/3321* (2013.01); *B65H 2553/41* (2013.01); *B65H 2553/414* (2013.01); *B65H 2553/81* (2013.01); *B65H 2801/39* (2013.01); *H04N 1/00631* (2013.01); *H04N 1/1215* (2013.01); *H04N 2201/0081* (2013.01)

(58) Field of Classification Search

CPC ........ B65H 2405/1134; B65H 2553/81; B65H 2405/3321

See application file for complete search history.

DOCUMENT CONVEYING DEVICE

INCORPORATION BY REFERENCE

This application is based on and claims the benefit of priority from Japanese patent application No. 2024-028714 filed on Feb. 28, 2024, which is incorporated by reference in its entirety.

BACKGROUND

The present disclosure relates to a document conveying device.

A document conveying device for conveying a document to a reading position of an image reading device is known. The document conveying device includes, for example, a sheet feeding tray on which the documents are placed, a discharge tray provided below the sheet feeding tray, and a conveying mechanism for conveying the document from the sheet feeding tray to the discharge tray via the reading position of the document reading device.

The convenience of the document conveying device increases as a capacity (an amount of the documents that can be placed) of the sheet feeding tray and the discharge tray increases. Therefore, a technique for realizing a large-capacity document conveying device has been studied. For example, there is an image reading device which includes a supply tray including a movable plate which moves upward according to a decrease in a number of sheets supported by the supply tray, a discharge tray which is positioned below the supply tray and supports the discharged sheets, a conveyance guide which conveys the sheets from the supply tray toward the discharge tray, a discharge unit which has a discharge port for discharging the sheets to the discharge tray and moves upward according to a decrease in a number of sheets supported by the supply tray, and a restriction surface which is provided between the conveyance guide and the movable plate and can abut against the sheets supported by the supply tray. The restriction surface is movable upward as the discharge unit moves.

The supply tray is generally provided with a reflective optical sensor for detecting the document. The reflective optical sensor needs to detect only the document in contact with the above restriction surface (hereinafter, it is referred to as a lifting wall part). This is because there is a possibility that the document cannot be fed even if a pickup roller is driven by the detection of the document not in contact with the lifting wall part. In order to detect only the document in contact with the lifting wall part, it is desirable to install the reflective optical sensor as close as possible to the lifting wall part. However, the pickup roller is provided above the reflective optical sensor. If the reflective optical sensor is disposed to emit light vertically upward, there is a risk of false detection as the light is reflected by the pickup roller.

SUMMARY

A document conveying device according to the present disclosure includes a sheet feeding tray, a sheet feeding mechanism, a sheet feeding tray lifting mechanism, a top plate, a fixed wall part, a lifting wall part, and a reflective optical sensor. On the sheet feeding tray, a document is placed. The sheet feeding mechanism feeds the sheet placed on the sheet feeding tray in a predetermined sheet feeding direction. The sheet feeding tray lifting mechanism lifts and lowers the sheet feeding tray. The top plate is adjacent to the sheet feeding tray on a downstream side in the sheet feeding direction, and is in contact with a lower surface of the document to be fed. The fixed wall part is provided extending downward from an upstream side end portion of the top plate in the sheet feeding direction and is fixed in position. The lifting wall part is provided extending upward from a downstream side end portion of the sheet feeding tray in the sheet feeding direction, and lifted and lowered along the fixed wall part together with the sheet feeding tray. The reflective optical sensor detects the document placed on the sheet feeding tray. The reflective optical sensor emits light in a direction inclined downstream of the sheet feeding direction from a vertically upward direction.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DISCLOSURE

Hereinafter, with reference to the drawings, a document conveying device 120 and an image forming apparatus 100 according to one embodiment of the present disclosure will be described.

Figure 1:
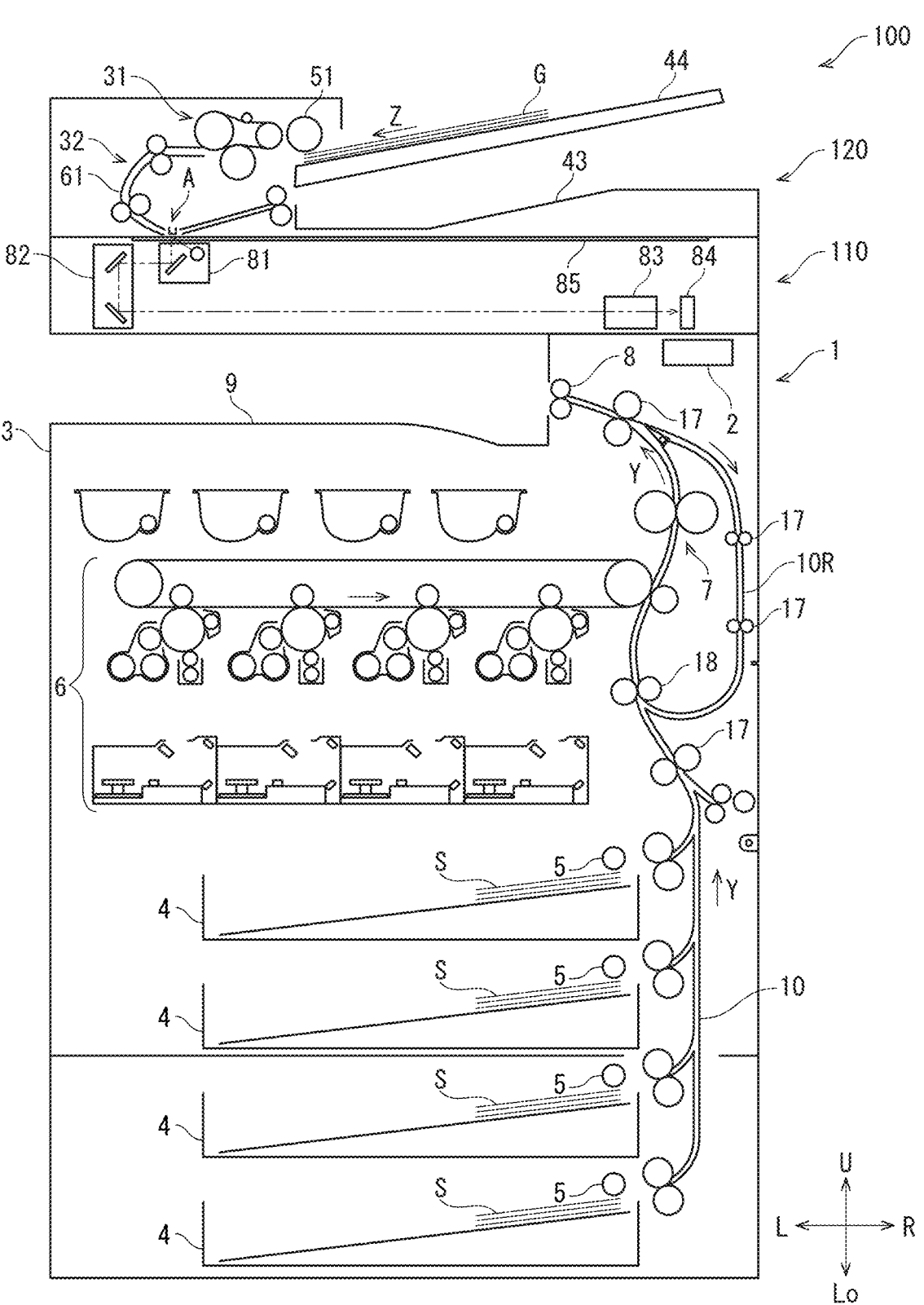
FIG. 1 is a front view schematically showing an internal structure of an image forming apparatus according to one embodiment of the present disclosure.

First, the overall configuration of the image forming apparatus 100 will be described. FIG. 1 is a front view schematically showing the internal structure of the image forming apparatus 100. Hereinafter, the front side of the paper plan on which FIG. 1 is drawn is defined as the front side of the image forming apparatus 100, and the right-and-left directions will be described with reference to the direction in which the image forming apparatus is viewed from the front side. In each figure, U, Lo, L, R, Fr, and Rr indicate the upper, lower, left, right, front, and rear, respectively.

The image forming apparatus 100 includes a printer 1, a scanner 110, and a document conveying device 120. The scanner 110 is provided above the printer 1, and the document conveying device 120 is provided above the scanner 110. The document conveying device 120 conveys a document G via a reading position A of the scanner 110. The scanner 110 is a flatbed type image scanner, and reads the document G to generate image data. The printer 1 forms an image on a sheet S based on the image data. In this embodiment, the printer 1 forms the image in an electrophotographic system, but the printer 1 may be configured to form an image in another system (for example, an inkjet system).

The printer 1 includes a rectangular parallelepiped body housing 3. In the lower portion in the body housing 3, a sheet feeding cassette 4 in which the sheet S is housed and a sheet feeding roller 5 which feeds the sheet S rightward from the sheet feeding cassette 4 are provided. Above the sheet feeding cassette 4, an image forming device 6 which forms a toner image in an electrophotographic manner is provided, and a fixing device 7 which fixes the toner image to the sheet S is provided in the right and upper side of the image forming device 6. Above the fixing device, a discharge roller 8 which discharges the sheet S to which the toner image is fixed and a discharge tray 9 on which the discharged sheet S is stacked are provided.

Inside the body housing 3, a conveyance path 10 from the sheet feeding roller 5 through the image forming device 6 and the fixing device 7 to the discharge roller 8 is provided. The conveyance path 10 is formed mainly of plate-like members facing each other with a gap for passing the sheet S, and a conveyance roller 17 for holding and conveying the sheet S is provided at a plurality of positions in the conveyance direction Y. A registration roller 18 is provided on the upstream side of the image forming device 6 in the conveyance direction Y. On the right side of the fixing device 7, there is provided an inversion conveyance path 10R which branches from the conveyance path 10 on the downstream side of the fixing device 7 in the conveyance direction Y and merges with the conveyance path 10 on the upstream side of the registration roller 18 in the conveyance direction Y.

A control part 2 includes an arithmetic part and a storage part (not shown). The arithmetic part is, for example, a CPU (Central Processing Unit). The storage part includes a storage medium such as ROM (Read Only Memory), RAM (Random Access Memory), and EEPROM (Electrically Erasable Programmable Read Only Memory). The arithmetic part reads and executes control program stored in the storage part to perform various processes. The control part 2 may be implemented only by an integrated circuit without using software.

A display operation part (not shown) is provided on the front side of the scanner 110. The display operation part is provided with a display panel, a touch panel superposed on the display surface of the display panel, and a keypad adjacent to the display panel (not shown). The control part 2 displays a screen showing an operation menu and a status of the printer 1 and the scanner 110 on the display panel, and controls each part of the printer 1 and the scanner 110 according to an operation detected by the touch panel and the keypad.

The basic image forming operation of the printer 1 is as follows. When a single-sided printing job is input to the printer 1 from the display operation part or an external computer, the sheet feeding roller 5 feeds the sheet S from the sheet feeding cassette 4 to the conveyance path 10, the registration roller 18 whose rotation is stopped corrects the skew of the sheet S, and the registration roller 18 feeds the sheet S to the image forming device 6 at a predetermined timing. The image forming device 6 forms a toner image on the sheet S by the electrophotographic method. Subsequently, the fixing device 7 fixes the toner image to the sheet S by melting the toner image while holding and conveying the sheet S, and the discharge roller 8 discharges the sheet S to the discharge tray 9. In the case of double-sided printing, the sheet S on which the toner image is fixed on the first surface is fed to the conveyance path 10 via the inversion conveyance path 10R, whereby the toner image is transferred to the second surface.

[Scanner] The scanner 110 includes a first carriage 81 including a light source and a reflecting mirror, a second carriage 82 including two reflecting mirrors, a lens 83 for forming an image with light, an imaging element 84 for converting the formed light into image data, and a contact glass 85 on which the document G is placed.

The basic document reading operation of the scanner 110 is as follows. When the user places the document G on the upper surface of the contact glass 85 and gives a reading instruction to the scanner 110, the first carriage 81 moves rightward at a speed V while the second carriage 82 moves rightward at a speed V/2. During this time, the light source irradiates the document G with light, and the reflected light reflected by the document G is reflected by the reflecting mirror of the first carriage 81 and the reflecting mirrors of the second carriage 82, is guided to the lens 83, forms an image on the imaging element 84, and is converted into an image signal. The image signal is output to the control part 2 of the printer 1 and converted into the image data.

Figure 2:
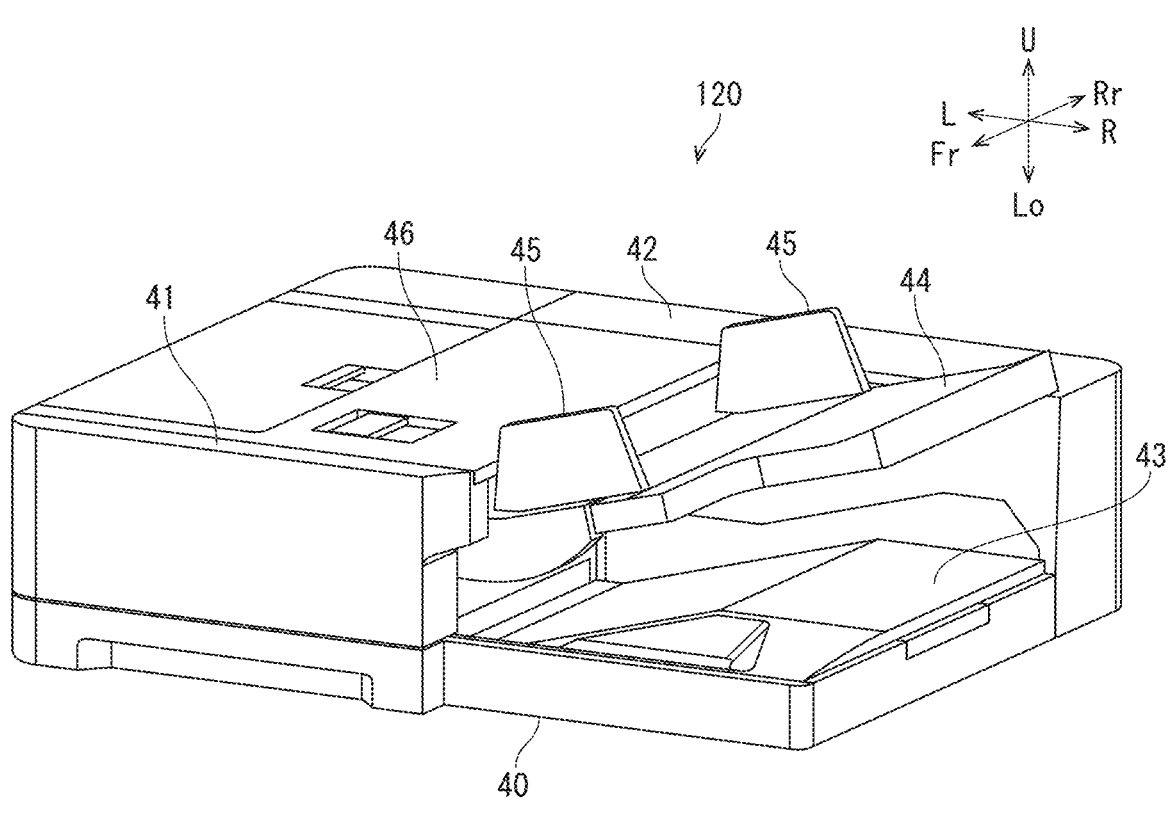
FIG. 2 is a perspective view showing an external appearance of a document conveying device according to the embodiment of the present disclosure.
Figure 3:
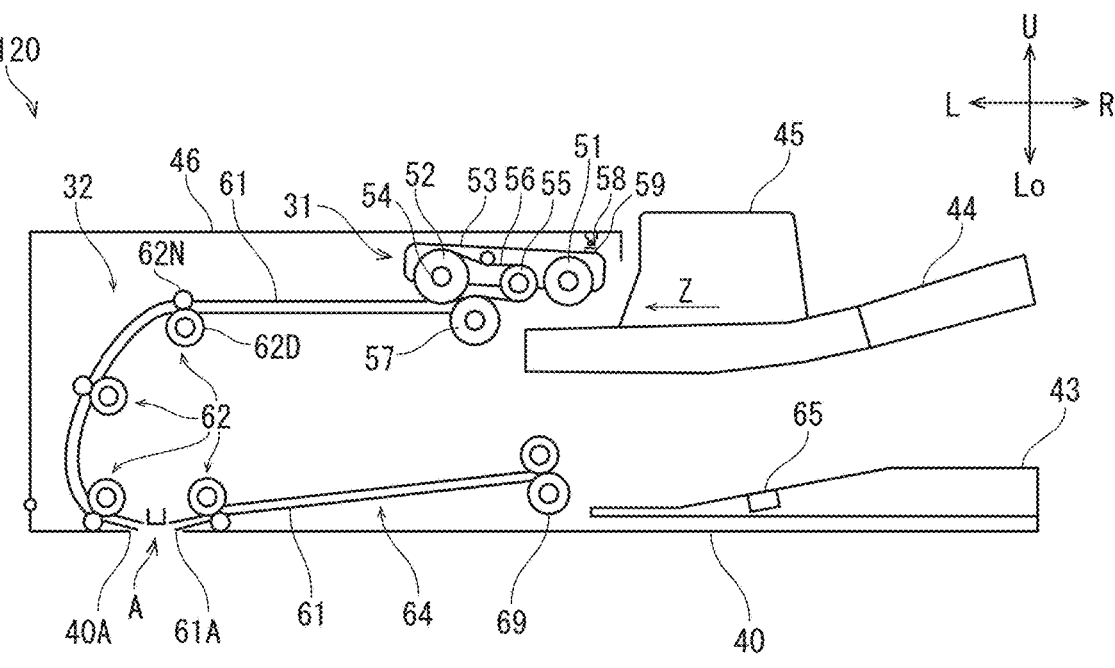
FIG. 3 is a front view schematically showing a sheet feeding mechanism and a conveying mechanism according to the embodiment of the present disclosure.
Figure 4:
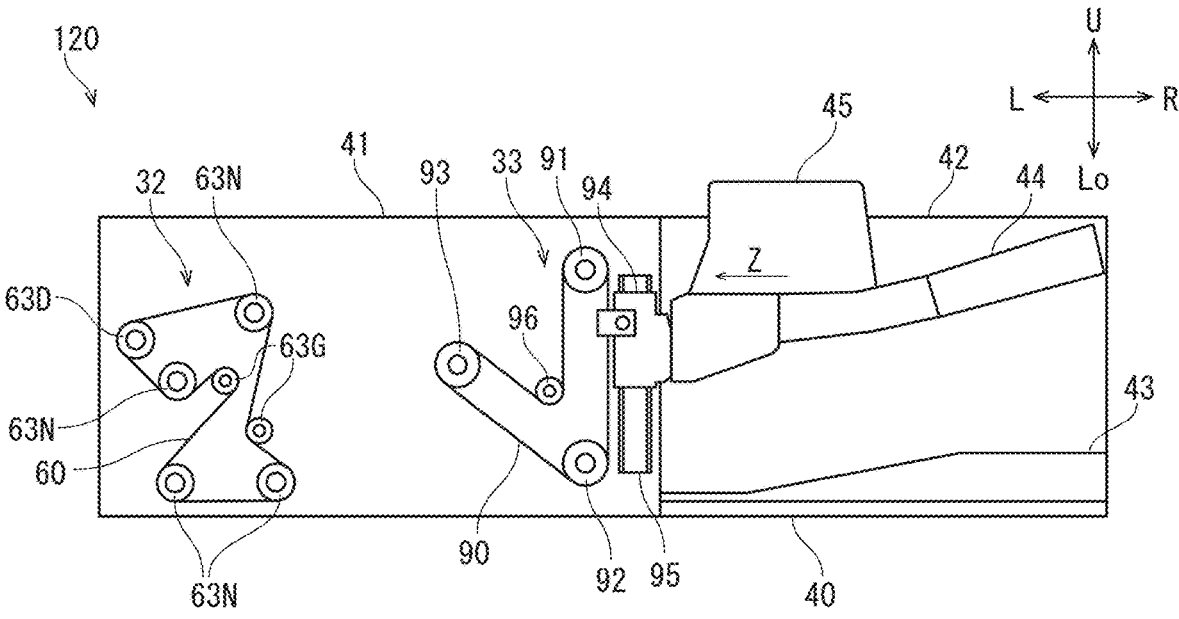
FIG. 4 is a front view schematically showing the conveying mechanism and a sheet feeding tray lifting mechanism according to the embodiment of the present disclosure.
Figure 5:
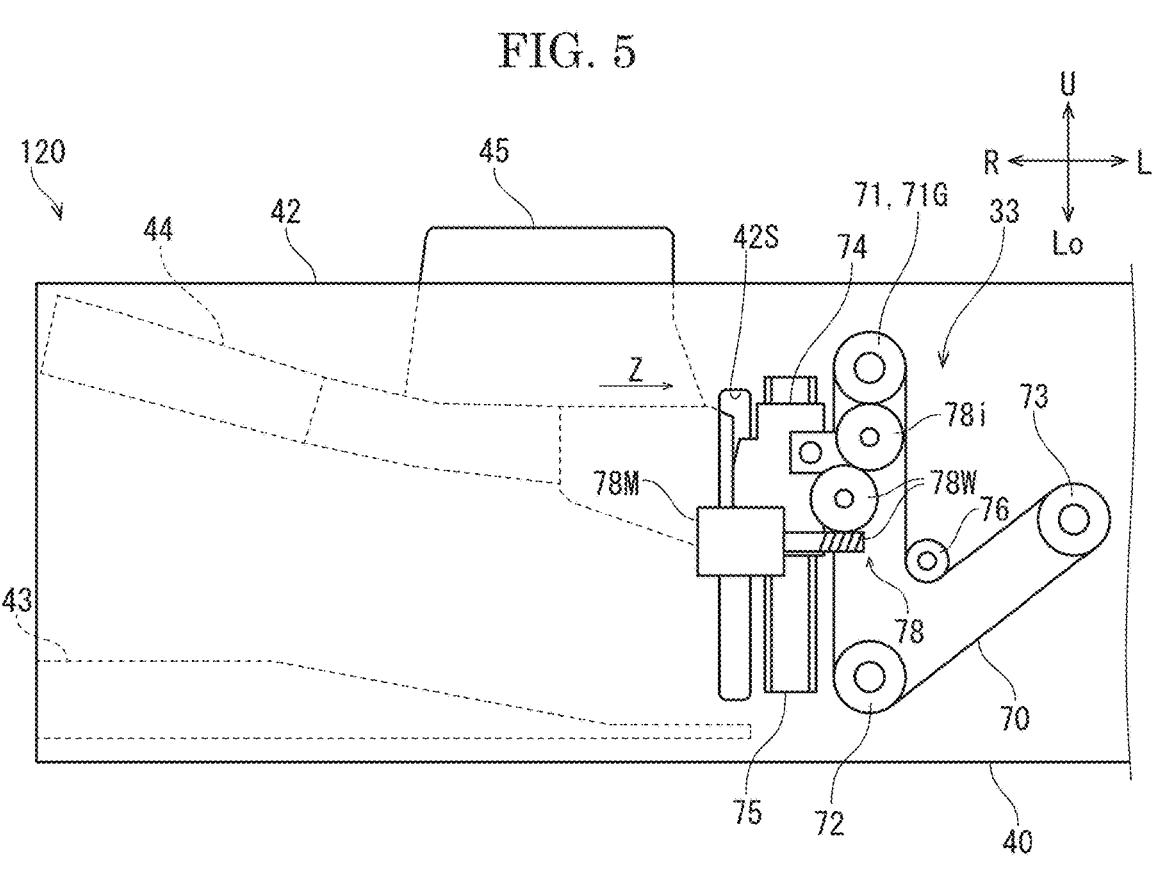
FIG. 5 is a rear view schematically showing the sheet feeding tray lifting mechanism according to the embodiment of the present disclosure.
Figure 6:
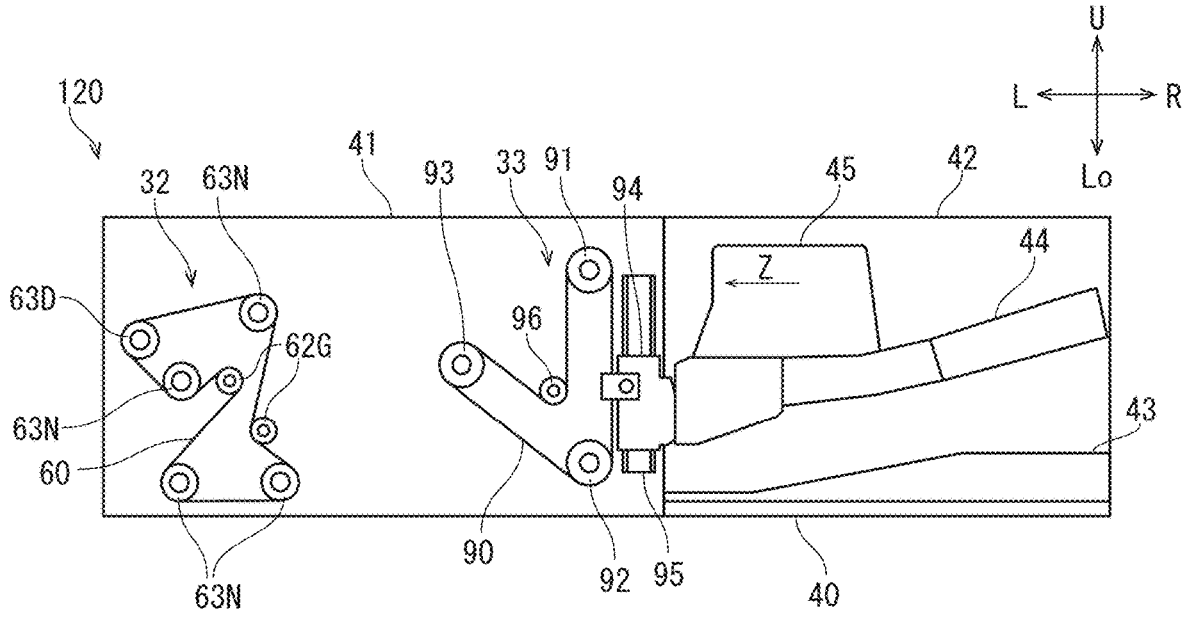
FIG. 6 is a front view schematically showing the conveying mechanism and the sheet feeding tray lifting mechanism according to the embodiment of the present disclosure.

[Document Conveying Device] Next, the document conveying device 120 will be described. FIG. 2 is a perspective view showing an external appearance of the document conveying device 120. FIG. 3 is a front view schematically showing a sheet feeding mechanism 31 and a conveying mechanism 32. FIG. 4 and FIG. 6 are front views schematically showing the conveying mechanism 32 and a sheet feeding tray lifting mechanism 33. FIG. 5 is a rear view schematically showing the sheet feeding tray lifting mechanism 33. FIG. 3, FIG. 4, and FIG. 5 show a state in which a sheet feeding tray 44 is positioned near the upper limit position, and FIG. 6 shows a state in which the sheet feeding tray 44 is positioned near the lower limit position.

The document conveying device 120 (see FIG. 2 and FIG. 3) includes a generally rectangular bottom portion 40 formed in a flat shape, and a first wall portion 41 and a second wall portion 42 facing each other in the front-and-rear direction (the width direction intersecting the sheet feeding direction Z of the document G). The rear edge portion of the bottom portion 40 is hinged on the rear side of the contact glass 85 (see FIG. 1) of the scanner 110. The bottom portion 40 also has a function of holding the document G on the contact glass 85. The first wall portion 41 is provided from the left end portion to the center portion of the front edge portion of the bottom portion 40. The second wall portion 42 is provided over the entire area of the rear edge portion of the bottom portion 40. A cover portion 46 covers the upper and left sides of the space between the first wall portion 41 and the second wall portion 42. The left lower end portion of the cover portion 46 is hinged to the left end portion of the bottom portion 40.

[Sheet Feeding Tray] A sheet feeding tray 44 (see FIG. 2 and FIG. 3) is provided on the right side of the center of the document conveying device 120 in the left-and-right direction and on the front side of the second wall portion 42. The sheet feeding tray 44 is a plate-like member inclined such that the left side is lowered. On the upper surface of the sheet feeding tray 44, a pair of cursors 45 for aligning the front and rear ends of the document G are provided. The cursor 45 is slidable in the front-and-rear direction.

[Discharge Tray] A discharge tray 43 is provided below the sheet feeding tray 44. The discharge tray 43 is integral with the bottom portion 40.

[Sheet Feeding Mechanism] A sheet feeding mechanism 31 (see FIG. 3) is provided in the space between the first wall portion 41 and the second wall portion 42. The sheet feeding mechanism 31 is provided with a box-shaped holder 53 whose lower portion is opened. Inside the holder 53, a pickup roller 51, a driven roller 55, a driving roller 52, and a retard roller 57 are arranged with their axial directions along the front-and-rear direction. The driven roller 55 is provided on the left side of the pickup roller 51. The driving roller 52 is provided on the left side of the driven roller 55. An endless belt 56 is wound around the driving roller 52 and the driven roller 55. The retard roller 57 is pressed against the lower surface of the lower portion of the endless belt 56.

Both front and rear ends of a driving shaft 54 of the driving roller 52 are supported by the first wall portion 41 and the second wall portion 42, and are connected to a drive part (not shown) including a motor and a reduction gear. The holder 53 is supported by the driving shaft 54, and can be turned around the driving shaft 54. A driving force is transmitted from the driving shaft 54 to the pickup roller 51 and the retard roller 57 by a transmission mechanism (not shown) such as a gear train or an endless belt.

A sensor 58 is a transmission type or a reflection type optical sensor, and is provided on the inner surface of the cover portion 46. A light shielding plate 59 protruding upward or sideways is provided on the upper portion of the holder 53. The sensor 58 outputs detection signals having different level to the control part 2 when the light shielding plate 59 blocks the light of the sensor 58 and when the light shielding plate does not block the light.

[Sheet Feeding Tray Lifting Mechanism] A sheet feeding tray lifting mechanism 33 (see FIG. 4 and FIG. 5) is provided on the front surface of the first wall portion 41 and the rear surface of the second wall portion 42. A driving pulley 71 and a driven pulley 72 (see FIG. 5) are provided at the upper and lower portions of the central portion of the rear surface of the second wall portion 42, respectively. A driven pulley 73 is provided at an intermediate height between the driving pulley 71 and the driven pulley 72 and on the left side of the driving pulley 71 and the driven pulley 73. A guide pulley 76 is provided on the left upper side of the driven pulley 72 and on the right side of the driven pulley 73. An endless belt 70 is wound around the driving pulley 71, the driven pulleys 72 and 73, and the guide pulley 76. A driving part 78 includes a motor 78M, a worm gear 78W, an idler gear 78i, and a driving gear 71G. The driving gear 71G is provided on the shaft of the driving pulley 71.

Driven pulleys 91, 92, 93, and the guide pulley 96 (see FIG. 4) are provided on the front surface of the first wall portion 41 at positions facing the driving pulley 71, the driven pulleys 72, 73, and the guide pulley 76, respectively. An endless belt 90 is wound around the driven pulleys 91, 92, 93 and the guide pulley 96. The driven pulley 93 is provided on the common shaft with the driven pulley 73.

A sliding part 74 (see FIG. 5) is provided at the left end portion of the rear edge portion of the sheet feeding tray 44. The second wall portion 42 is provided with a slit 42S whose longitudinal direction is along the upper-and-lower direction. The slit 42S is provided at a position corresponding to the left end portion of the rear edge portion of the sheet feeding tray 44. The sliding part 74 penetrates the slit 42S, and is coupled to the endless belt 70 between the driving pulley 71 and the driven pulley 72.

A lifting guide part 75 is provided on the rear surface of the second wall portion 42. The lifting guide part 75 is a rail-like member whose longitudinal direction is along the upper-and-lower direction. The sliding part 74 is slidable in the upper-and-lower direction along the lifting guide part 75.

A sliding part 94 (see FIG. 4) is provided at the left end portion of the front edge portion of the sheet feeding tray 44. The sliding part 94 is coupled to the endless belt 90 between the driven pulley 91 and the driven pulley 92.

A lifting guide part 95 is provided on the front surface of the first wall portion 41. The lifting guide part 95 is a rail-like member whose longitudinal direction is along the upper-and-lower direction. The sliding part 94 is slidable in the upper-and-lower direction along the lifting guide part 95.

The basic operation of the sheet feeding tray lifting mechanism 33 is as follows. A driving force generated by the motor 78M is transmitted to the driving gear 71G via the worm gear 78W and the idler gear 78i. The driving pulley 71 is rotated together the driving gear 71G, the endless belt 70 travels, and the driven pulleys 72 and 73 are rotated accordingly. The driven pulley 93 is rotated together with the driven pulley 73, and the endless belt 90 travels synchronously with the endless belt 70. Since the sheet feeding tray 44 is coupled to the endless belts 70, 90 via the sliding parts 74, 94, the sheet feeding tray 44 is lifted and lowered by the forward and reverse rotations of the motor 78M.

The control part 2 controls the sheet feeding tray lifting mechanism 33 to lift the sheet feeding tray 44. When the upper surface of the document G placed on the sheet feeding tray 44 is pressed against the pickup roller 51, the holder 53 is turned upward. When the holder 53 is turned upward by a predetermined amount, the light shielding plate 59 blocks the light of the sensor 58. At this time, an appropriate load acts between the upper surface of the document G and the pickup roller 51, and the document G can be fed by the pickup roller 51. In other words, the control part 2 controls the sheet feeding tray lifting mechanism 33 so as to lift the sheet feeding tray 44 as an amount of documents G placed on the sheet feeding tray 44 decreases.

[Conveying Mechanism] A conveying mechanism 32 (see FIG. 3) includes a conveyance path 61 extending from the sheet feeding mechanism 31 to the discharge roller 69 via an opening 40A, and a plurality of conveying rollers 62 arranged in the conveyance path 61. The conveyance path 61 is formed mainly of plate-like members facing each other with a gap through which the document G can pass. The opening 40A is a slit provided in the bottom portion 40 at a region facing the first carriage 81 (see FIG. 1) located at the home position and whose longitudinal direction is along the front-and-rear direction. The opening 40A is an example of the reading position A where the scanner 110 reads the document G. At the reading position A, an opening 61A corresponding to the opening 40A is provided in a plate-like member on the lower side of the conveyance path 61, and the lower surface of the document G being conveyed is exposed downward through the openings 40A and 61A.

The conveying roller 62 includes a driving roller 62D and a driven roller 62N (see FIG. 3). A driven pulley 63N (see FIG. 4) is provided on the shaft of the driving roller 62D. A driving pulley 63D is connected to a driving part (not shown) including a motor and a reduction gear. An endless belt 60 is wound around the driving pulley 63D, the driven pulleys 63N, and a guide pulley 63G. When the driving pulley 63D is driven, the endless belt 60 is traveled and the driven pulleys 63N are rotated synchronously, so that the conveying rollers 62 are also rotated synchronously.

A guide part 64 (FIG. 3) is provided in the conveyance path 61 on the downstream side of the opening 40A in the sheet feeding direction Z. The guide part 64 is formed by integrating plate-like members facing in the upper-and-lower direction, and is turned around the driving roller 62D or the driven roller 62N of the conveying roller 62 adjacent to the right side of the opening 40A. A description of the mechanism for turning the guide part 64 is omitted.

Figure 7:
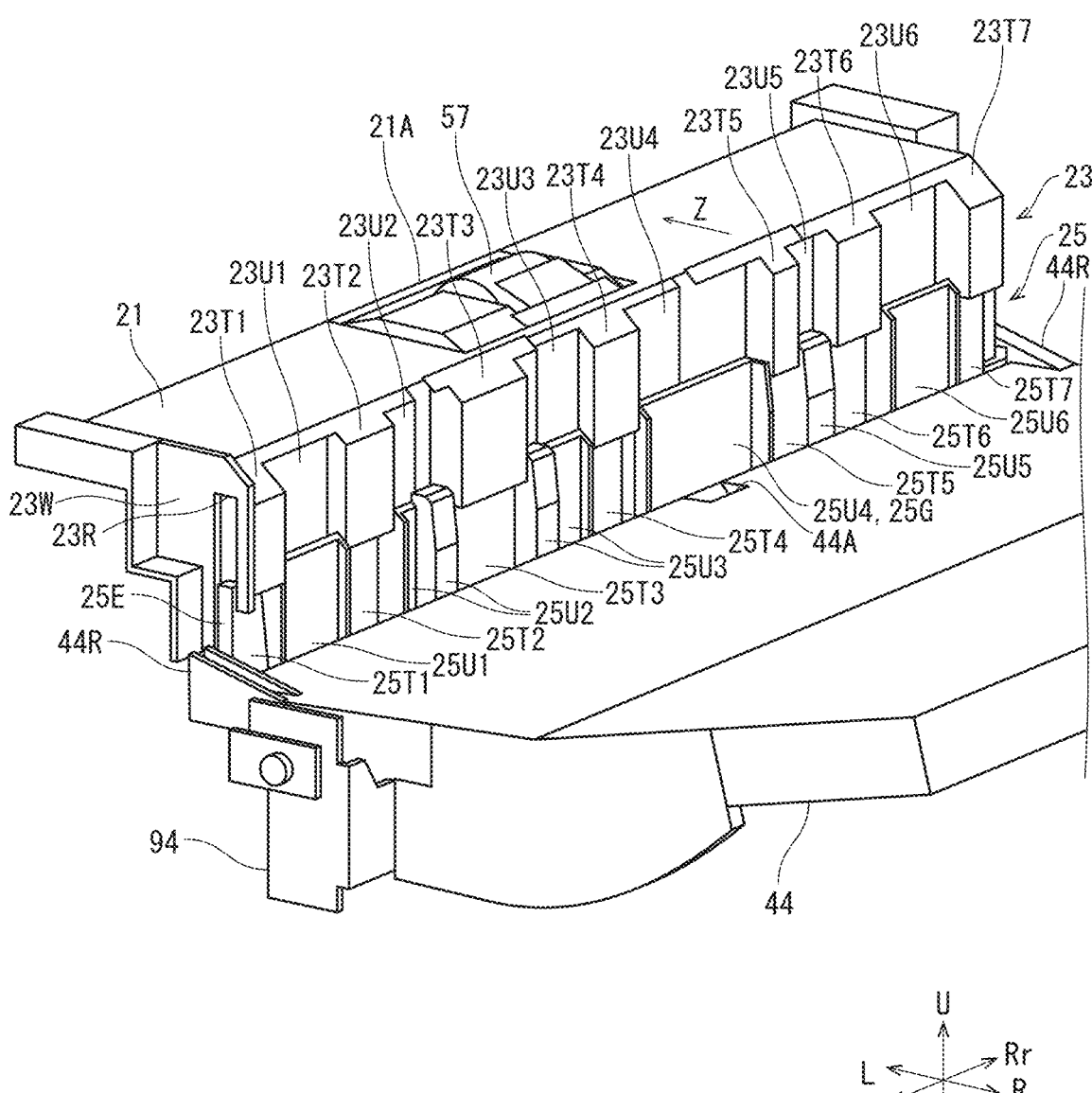
FIG. 7 is a perspective view showing a fixed wall part, a lifting wall part, and a sheet feeding tray.
Figure 8:
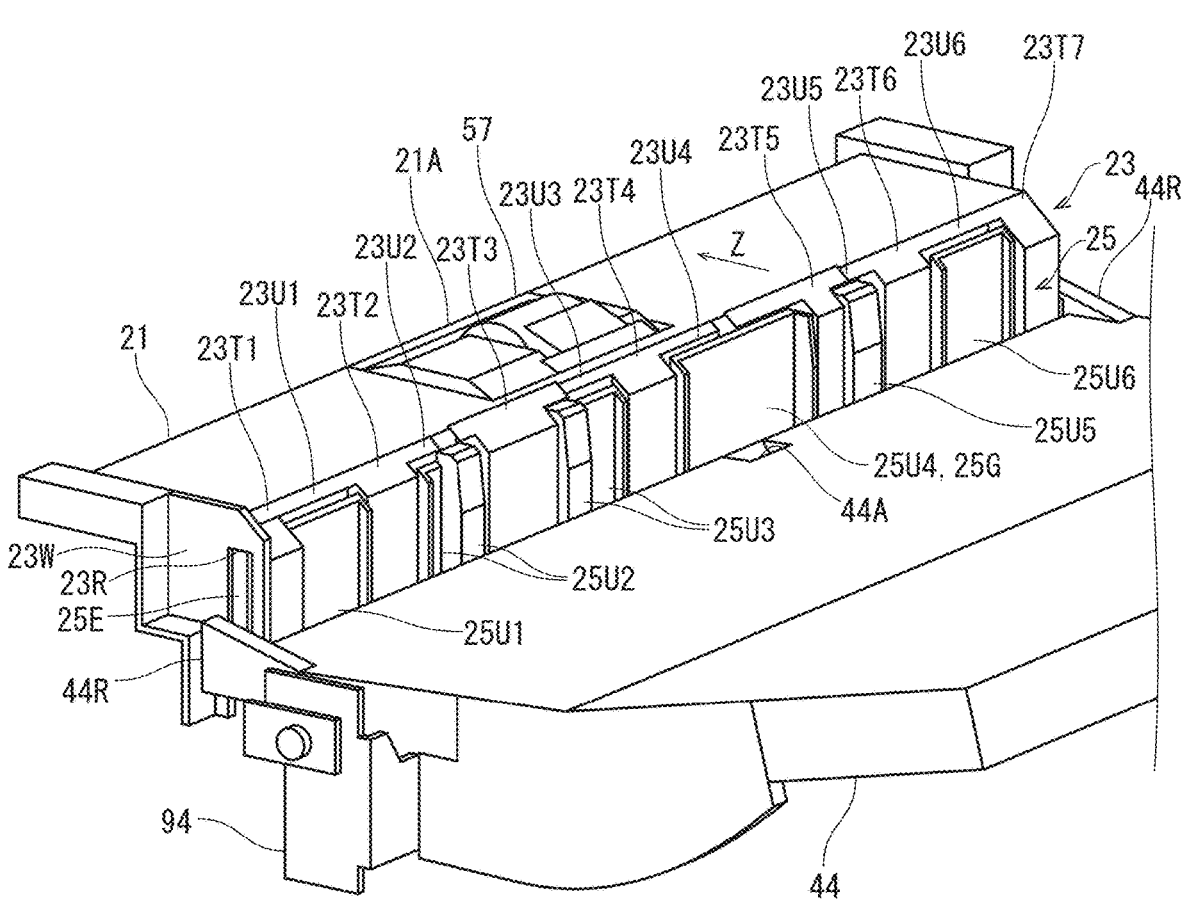
FIG. 8 is a perspective view showing the fixed wall part, the lifting wall part, and the sheet feeding tray.
Figure 8:
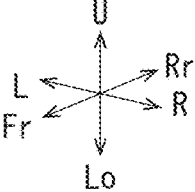
Figure 9:
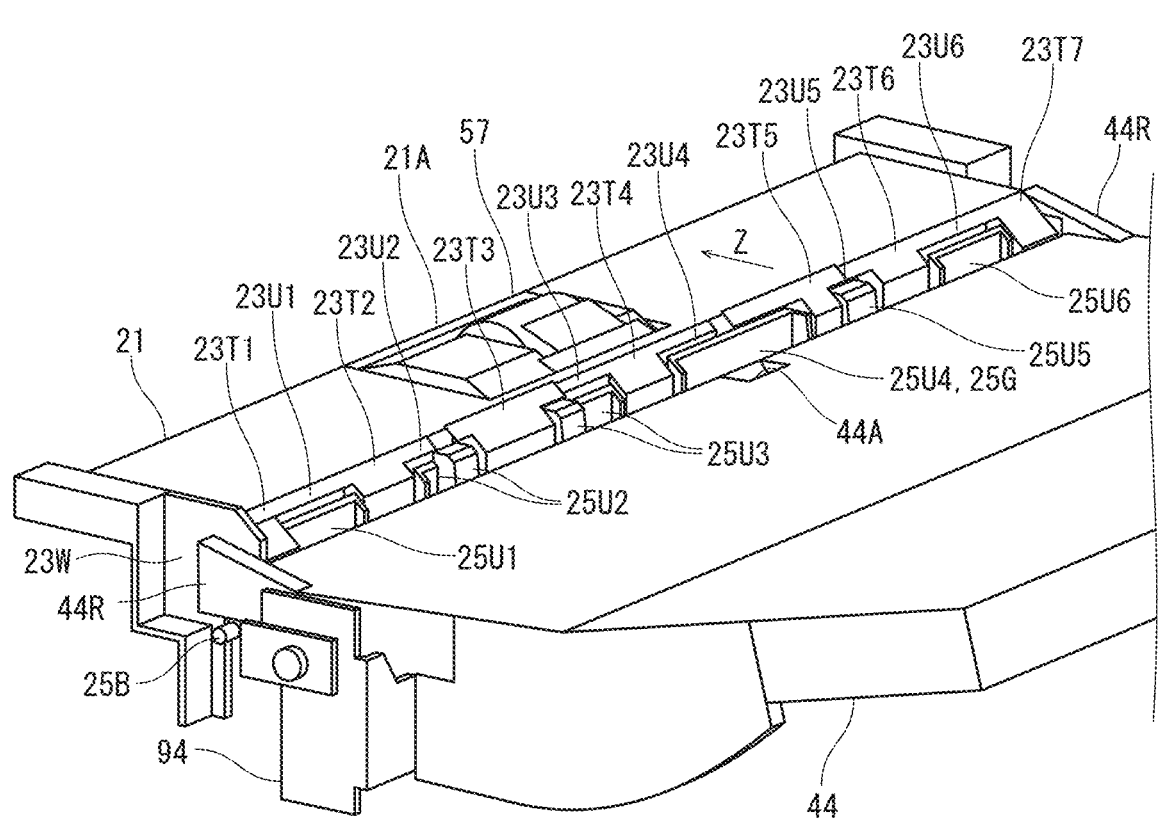
FIG. 9 is a perspective view showing the fixed wall part, the lifting wall part, and the sheet feeding tray.
Figure 9:
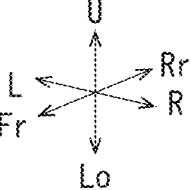
Figure 10:
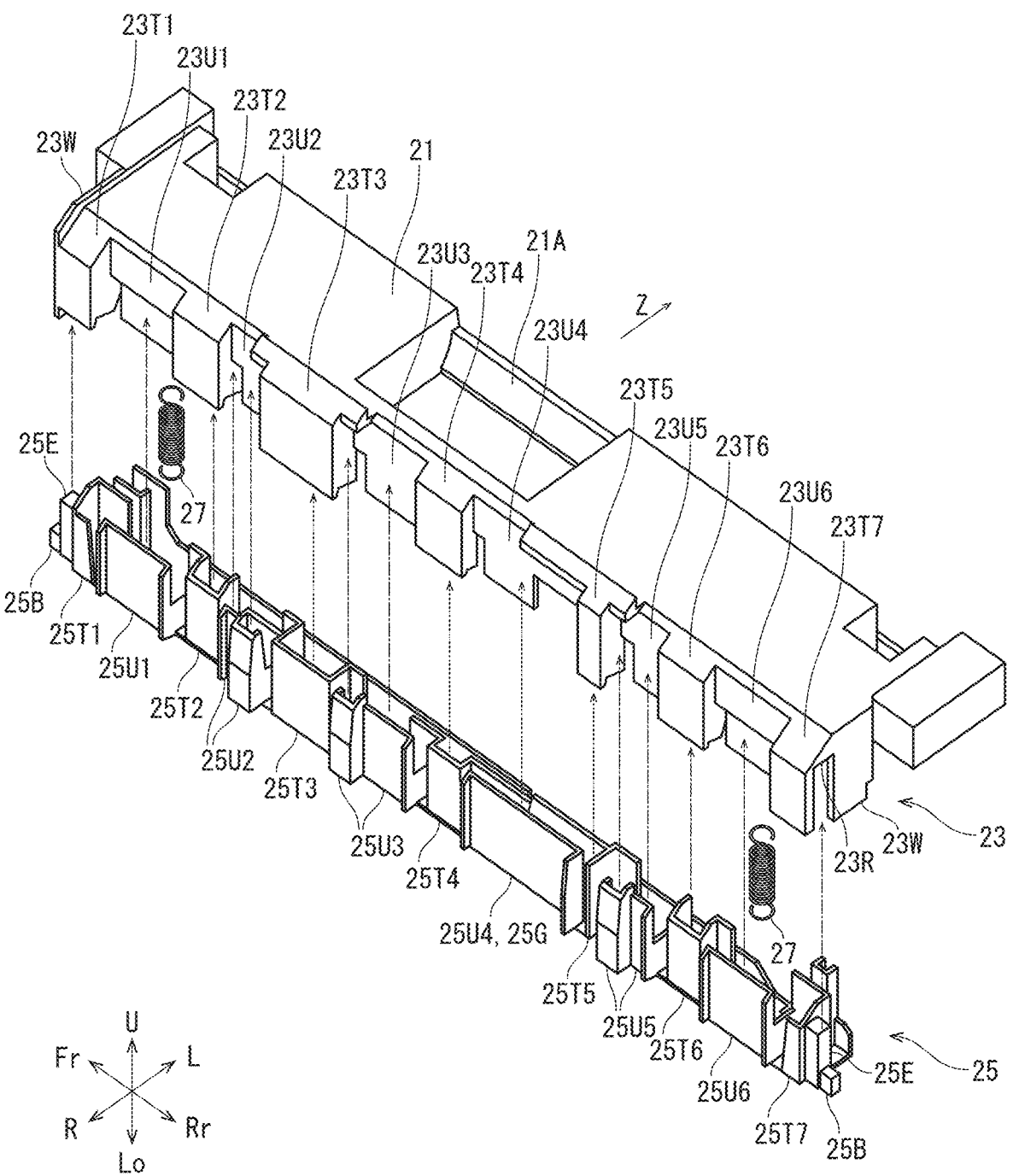
FIG. 10 is a disassembled view showing the fixed wall part and the lifting wall part.
Figure 11:
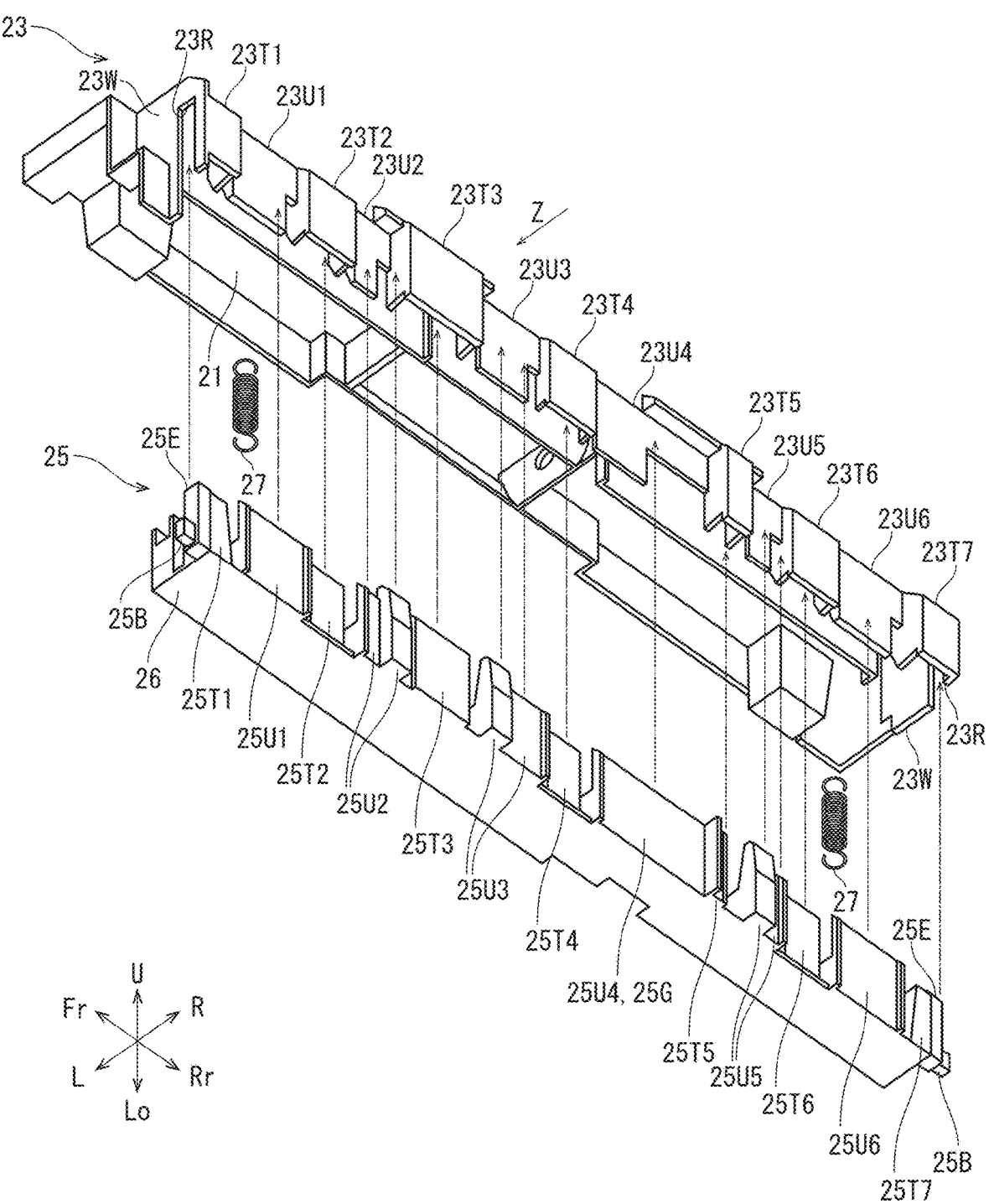
FIG. 11 is a disassembled view showing the fixed wall part and the lifting wall part.

[Structure of Fixed Wall Part and Lifting Wall Part] Next, a fixed wall part 23 and a lifting wall part 25 will be described. FIG. 7 to FIG. 9 are perspective views showing the fixed wall part 23, the lifting wall part 25, and the sheet feeding tray 44. FIG. 7 shows a state where the lifting wall part 25 and the sheet feeding tray 44 are positioned at the lower limit position. FIG. 8 shows a state in which the lifting wall part 25 is positioned at the upper limit position and the sheet feeding tray 44 is positioned at the intermediate position. FIG. 9 shows a state in which the lifting wall part 25 is positioned at the upper limit position and the sheet feeding tray 44 is positioned at the upper limit position. FIG. 10 and FIG. 11 are disassembled views showing the fixed wall part 23 and the lifting wall part 25.

The document conveying device 120 includes the sheet feeding tray 44 on which the document G is placed, the sheet feeding mechanism 31 which feeds the document G placed on the sheet feeding tray 44 in the predetermined sheet feeding direction Z, the sheet feeding tray lifting mechanism 33 which lifts and lowers the sheet feeding tray 44, a top plate 21 adjacent to the sheet feeding tray 44 on the downstream side in the sheet feeding direction Z and in contact with the lower surface of the document G to be fed, the fixed wall part 23 provided extending downward from the upstream end portion of the top plate 21 in the sheet feeding direction Z and fixed in position, and the lifting wall part 25 provided extending upward from the downstream end portion of the sheet feeding tray 44 in the sheet feeding direction Z and lifting/lowering along the fixed wall part 23 together with the sheet feeding tray 44.

[Top Plate] The top plate 21 (see FIG. 7 to FIG. 11) is provided generally horizontally. An opening 21A is provided at the center of the top plate 21 in the front-and-rear direction. The retard roller 57 included in the sheet feeding mechanism 31 is disposed in the opening 21A. The document G fed by the pickup roller 51 is conveyed along the upper surface while bringing its lower surface into contact with the upper surface of the top plate 21.

[Fixed Wall Part] The fixed wall part 23 is a rectangular member whose longitudinal direction is along the front-and-rear direction as a whole, and is provided in a posture downwardly upright from the upstream end portion of the top plate 21 in the sheet feeding direction Z, and is integrated with the top plate 21. The fixed wall part 23 includes a plurality of convex portions 23T1, 23T2, 23T3, 23T4, 23T5, 23T6, and 23T7, and a plurality of concave portions 2301, 2302, 23U3, 23U4, 2305, and 23U6. The convex portions 23T1 to 23T7 are provided at intervals along the upstream end portion of the top plate 21 in the sheet feeding direction Z, protrude toward the sheet feeding tray 44, and have a hollow structure with the lower end portion opened. The concave portions 23U1 to 2306 are alternately provided with the convex portions 23T1 to 23T7. The convex portion 23T1, the concave portion 23U1, the convex portion 23T2, the concave portion 23U2, the convex portion 23T3, the concave portion 23U3, the convex portion 23T4, the concave portion 23U4, the convex portion 23T5, the concave portion 23U5, the convex portion 23T6, the concave portion 2306, and the convex portion 23T7 are arranged in this order from the front side.

Each of the convex portions 23T1 to 23T7 is formed in a substantially rectangular parallelepiped shape having a smaller dimension in the left-and-right direction than the upper-and-lower direction. The upper end portions of the convex portions 23T1 to 23T7 and the concave portions 23U1 to 2306 are inclined so that the downstream side in the sheet feeding direction Z becomes higher. Shapes and dimensions of the convex portions 23T1 to 23T7 may be different from each other as shown, but may be the same. Shapes and dimensions of the concave portions 23U1 to 2306 may be different from each other as shown, but may be the same.

[Restriction Part] Wall parts 23W are provided extending downwardly upright from both front and rear end portions of the top plate 21. The wall parts 23W are integrated with the top plate 21 and the fixed wall part 23. A restriction part 23R is a slit provided in the wall part 23W along the upper-and-lower direction. The upper end of the restriction part 23R is closed, and the lower end is opened.

[Lifting Wall part] A bottom plate 26 faces the top plate 21 below the top plate 21. The lifting wall part 25 is provided extending upwardly upright from the upstream end portion of the bottom plate 26 in the sheet feeding direction Z, and is integrated with the bottom plate 26. The lifting wall part 25 includes a plurality of convex fitting portions 25T1, 25T2, 25T3, 25T4, 25T5, 25T6, and 25T7, and a plurality of concave fitting portions 25U1, 25U2, 25U3, 25U4, 25U5, and 25U6. The convex fitting portions 25T1, 25T2, 25T3, 25T4, 25T5, 25T6, and 25T7 are fitted inside the convex portions 23T1, 23T2, 23T3, 23T5, 23T6, 23T4, and 23T7, respectively. The concave fitting portions 2501, 25U2, 25U3, 25U4, 2505, and 25U6 are fitted inside the concave portions 23U1, 23U2, 23U3, 23U4, 23U5, and 23U6, respectively. With the lifting and lowering of the sheet feeding tray 44, the convex fitting portions 25T1 to 25T7 slide along the convex portions 23T1 to 23T7, and the concave fitting portions 25U1 to 2506 slide along the concave fitting portions 23U1 to 2306.

[End Portion] The front and rear end portions 25E of the lifting wall part 25 are inserted into the restriction parts 23R, and slide along the restriction parts 23R. Since the upper end portion of the restriction part 23R is closed, when the end portion 25E comes into contact with the upper end portion of the restriction part 23R, the lifting of the lifting wall part 25 is stopped. When the end portion 25E comes into contact with the upper end portion of the restriction part 23R, the upper end portion of the lifting wall part 25 becomes the same height as the upper end portion of the fixed wall part 23. Protrusions 25B protrude in the front-and-rear direction from the front and rear end portions 25E of the lifting wall part 25.

[Biasing Member] A biasing member 27 (see FIG. 10 and FIG. 11) is a tension coil spring disposed between the top plate 21 and the bottom plate 26 in an upright posture. The upper end of the biasing member 27 is attached to the lower surface of the top plate 21, and the lower end is attached to the upper surface of the bottom plate 26. Since the top plate 21 is fixed, the bottom plate 26 and the lifting wall part 25 are biased upward.

Figure 12:
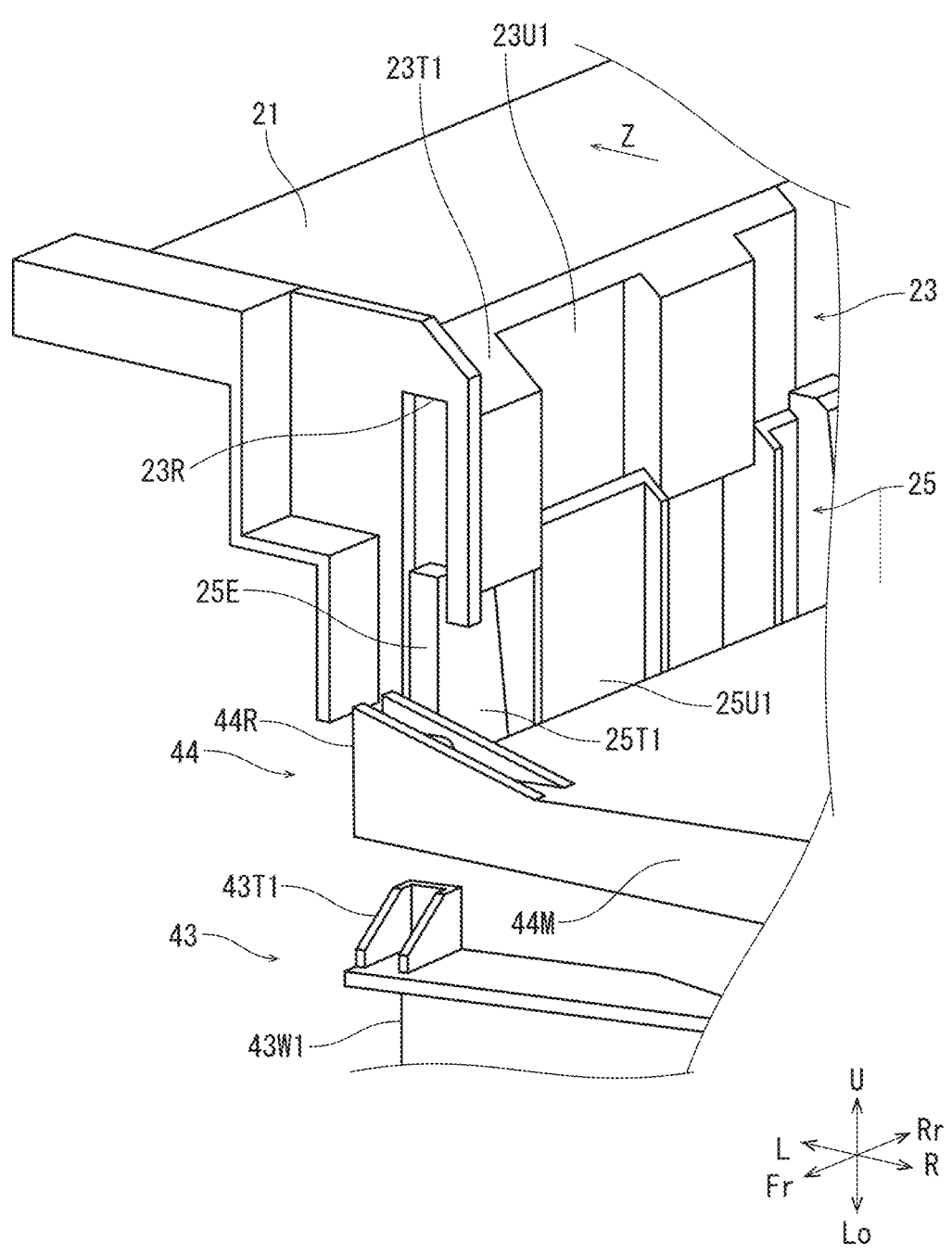
FIG. 12 is a perspective view showing the front portions of the fixed wall part, the lifting wall part, the sheet feeding tray, and the discharge tray.
Figure 13:
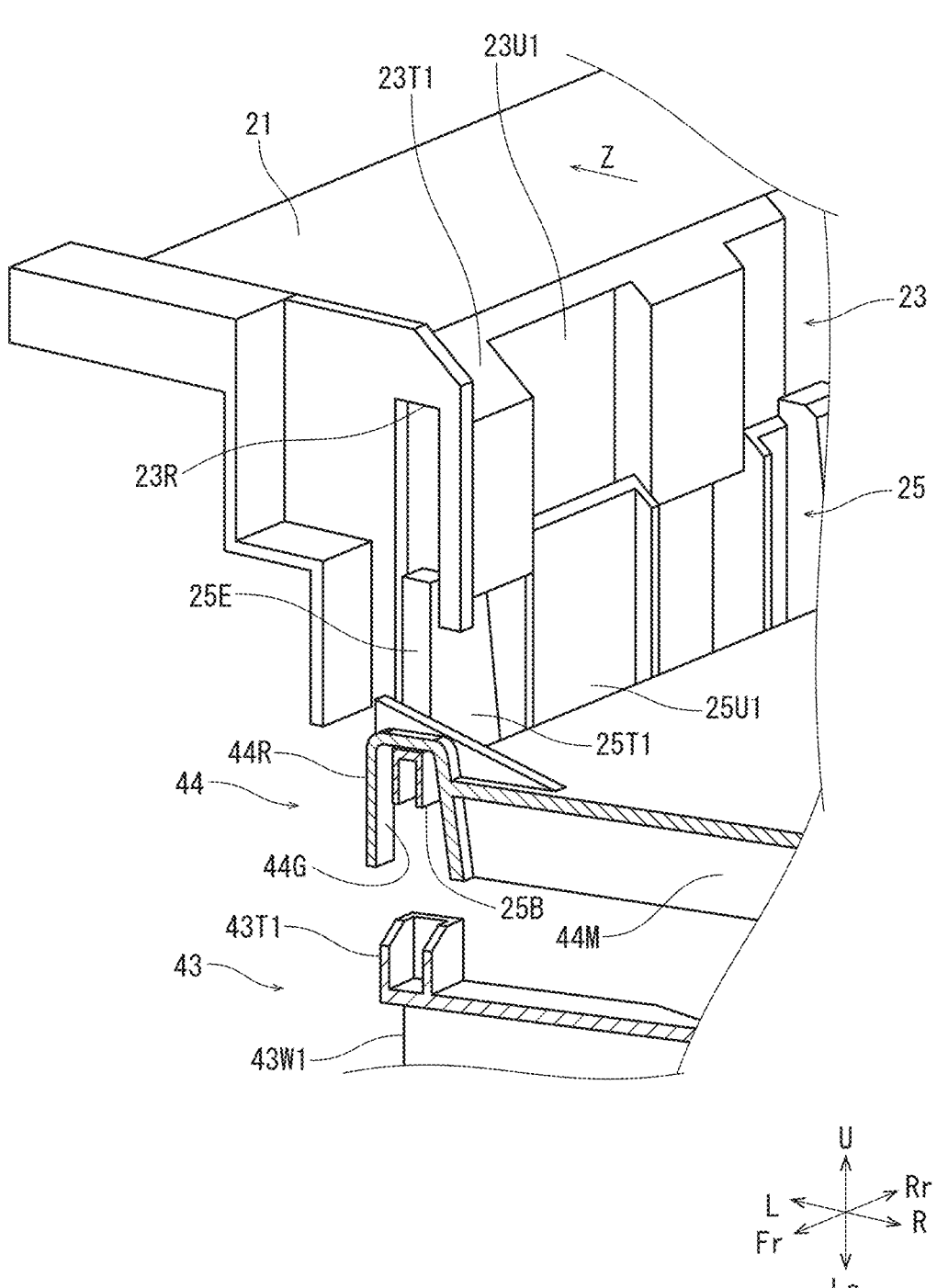
FIG. 13 is a perspective view showing the cross section of the front portions of the lifting wall part, the sheet feeding tray, and the discharge tray.
Figure 14:
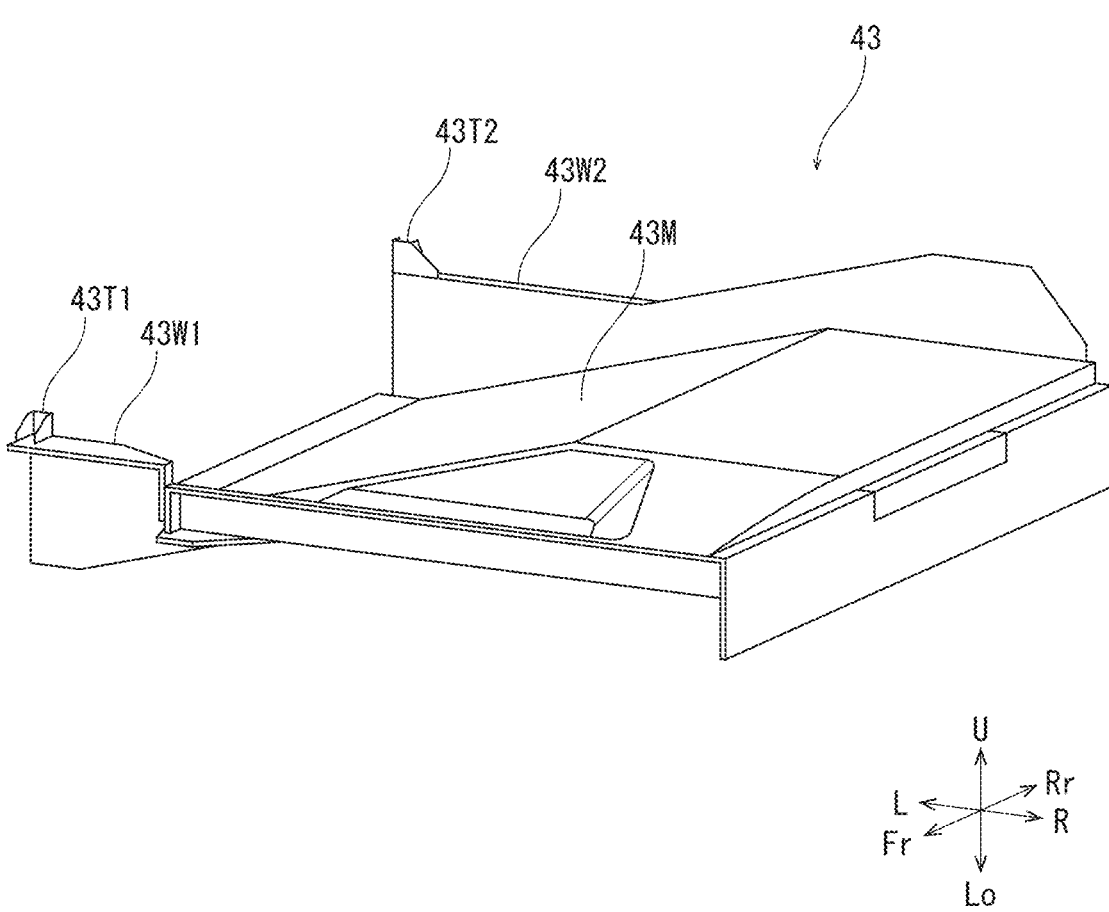
FIG. 14 is a perspective view showing the discharge tray.
Figure 15:
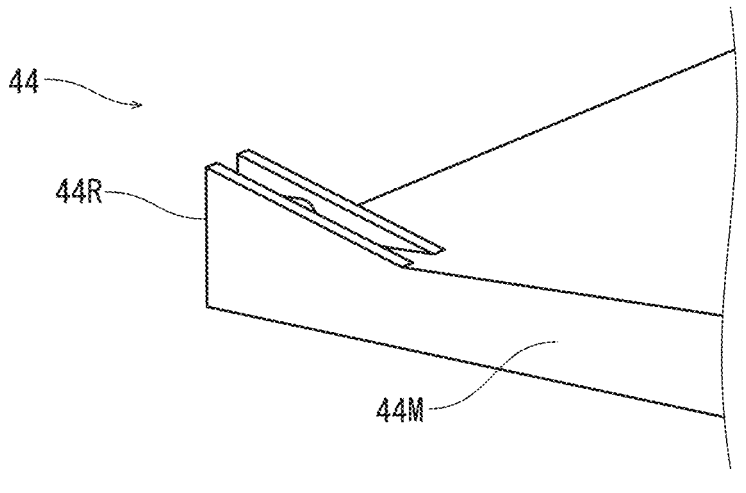
FIG. 15 is a perspective view showing an engagement part.
Figure 15:
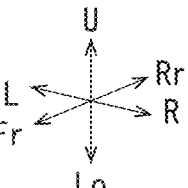
Figure 16:
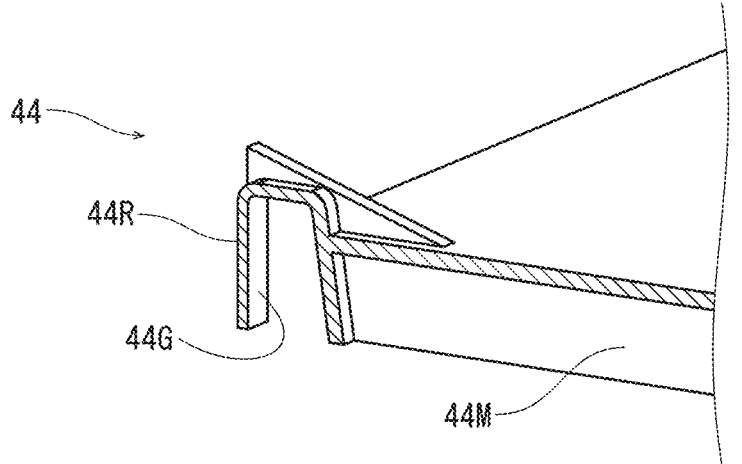
FIG. 16 is a perspective view showing the cross section of the engagement part.
Figure 16:
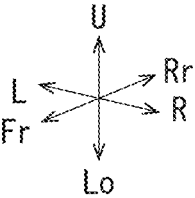

[Engagement Part] FIG. 12 is a perspective view showing the front portions of the fixed wall part 23, the lifting wall part 25, the sheet feeding tray 44, and the discharge tray 43. FIG. 13 is a perspective view showing a cross section of the front portions of the lifting wall part 25, the sheet feeding tray 44, and the discharge tray 43. FIG. 14 is a perspective view showing the discharge tray 43. FIG. 15 is a perspective view showing an engagement part 44R. FIG. 16 is a perspective view showing a cross section of the engagement part 44R.

Engagement parts 44R (see FIG. 12, FIG. 13, FIG. 15 and FIG. 16) protrude in the sheet feeding direction Z from both the front and rear end portions of the downstream end portion of the sheet feeding tray 44 in the sheet feeding direction Z. In this figure, only the front engagement part 44R is shown, but the rear engagement part 44R is constructed in the same manner. The engagement part 44R includes a recess 44G opened downward. By accommodating the protrusion 25B of the lifting wall part 25 in the recess 44G, the engagement part 44R is engaged with the protrusion 25B.

Since the lifting wall part 25 is biased upward by the biasing members 27 as described above, the protrusion 25B is pressed against the recess 44G. With this configuration, the lifting of the lifting wall part 25 is restricted, and the lifting wall part 25 is kept in a state of protruding upward by a predetermined height from the downstream end portion of the sheet feeding tray 44 in the sheet feeding direction Z.

[Lowering Restriction part of Discharge Tray] The discharge tray 43 (see FIG. 14) has a body portion 43M, wall portions 43W1, 43W2, and lowering restriction portions 43T1, 43T2. The document G discharged from the discharge roller 69 is placed on the body portion 43M. The wall portion 43W1 is provided over a predetermined range including the left end portion of the front edge portion of the body portion 43M. The wall portion 43W2 is provided over substantially the entire area of the rear edge portion of the body portion 43M. The document G discharged from the discharge roller 69 passes through a space between the wall portion 43W1 and the wall portion 43W2.

The lowering restriction parts 43T1, 43T2 are provided at the left end portions of the upper edge portions of the wall portions 43W1, 43W2, respectively (see FIG. 12 to FIG. 14). In other words, the lowering restriction parts 43T1, 4312 are provided outside the space through which the document G discharged from the discharge roller 69 passes. The lowering restriction parts 43T1, 43T2 protrude upward. The upper end portions of the lowering restriction parts 43T1, 43T2 are formed generally horizontally. The lowering restriction parts

43T1 is disposed below the front protrusion 25B. The lowering restriction part 43T2 is disposed below the rear protrusion 25B.

Next, the operation of this embodiment will be described. When the lifting wall part 25 is positioned at the lower limit position (see FIG. 7), the upper end portion of the lifting wall part 25 is positioned slightly above the lower end portion of the fixed wall part 23, so that a gap in the upper-and-lower direction is not formed between the lifting wall part 25 and the fixed wall part 23. In this case, a height of the wall formed by the lifting wall part 25 and the fixed wall part 23 becomes maximum, and a capacity of the sheet feeding tray 44 (an amount of the document G that can be placed) becomes maximum. When the lifting wall part 25 is positioned at the lower limit position, a clearance is provided between the protrusions 25B and the lowering restriction parts 43T1, 43T2, and the protrusions 25B does not come into contact with the lowering restriction parts 43T1, 43T2.

Since the lifting wall part 25 is biased upward by the biasing member 27, when the sheet feeding tray 44 is lifted by the sheet feeding tray lifting mechanism 33, the lifting wall part 25 is also lifted together with the sheet feeding tray 44. At this time, the convex fitting portions 25T1 to 25T7 of the lifting wall part 25 slide along the convex portions 23T1 to 23T7 of the fixed wall part 23, and the concave fitting portions 25U1 to 2506 of the lifting wall part 25 slide along the concave portions 23U1 to 2306 of the fixed wall part 23.

When the front and rear end portions 25E of the lifting wall part 25 are in contact with the upper end portion of the restriction parts 23R (see FIG. 8), the lifting of the lifting wall part 25 is stopped, and the lifting wall part 25 reaches the upper limit position. At this time, the sheet feeding tray 44 is positioned at an intermediate position between the lower limit position and the upper limit position. When the sheet feeding tray 44 is lifted further, the recess 44G of the engagement part 44R is separated from the protrusion 25B of the lifting wall part 25, and only the sheet feeding tray 44 is lifted.

When the sheet feeding tray 44 reaches the upper limit position (see FIG. 9), the downstream end portion of the upper surface of the sheet feeding tray 44 in the sheet feeding direction Z is positioned slightly below the upper surface of the top plate 21. In this case, a height of the wall formed by the lifting wall part 25 and the fixed wall part 23 is minimized, and a capacity of the sheet feeding tray 44 is minimized. As described above, since the upper end portions of the convex portions 23T1 to 23T7 and the concave portions 23U1 to 2306 of the fixed wall part 23 are inclined so that the downstream side of the sheet feeding direction Z becomes higher, the document G is smoothly fed from the sheet feeding tray 44 toward the top plate 21.

When the sheet feeding tray 44 is lowered from the upper limit position and reaches the intermediate position (see FIG. 8), the recess 44G of the engagement part 44R comes into contact with the protrusion 25B of the lifting wall part 25. When the sheet feeding tray 44 is further lowered, the protrusion 25B is pushed down by the recess 44G, and the lifting wall part 25 is lowered together with the sheet feeding tray 44.

According to the above configuration, the downstream side edge of the document G in the sheet feeding direction Z is positioned by the wall formed by the fixed wall part 23 and the lifting wall part 25. As the sheet feeding tray 44 is lowered, a height of the wall increases, thereby increasing a capacity of the sheet feeding tray 44. Accordingly, a capacity of the sheet feeding tray 4 can be increased without increasing a size of the downstream side wall of the sheet feeding tray 44 in the sheet feeding direction Z in the upper-and-lower direction. As a result, since a height of the discharge port for discharging the document G to the discharge tray 43 can be varied in a wide range, a capacity of the discharge tray 43 can be increased. Since the convex fitting portions 25T1 to 25T7 slide with respect to the convex portions 23T1 to 23T7, and the concave fitting portions 25U1 to 25U6 slide with respect to the concave portions 23U1 to 23U6, the lifting wall part 25 can be lifted and lowered smoothly and in a stable posture.

In the above configuration, the lifting wall part 25 is suspended from the fixed wall part 23 via the biasing members 27, but the fixed wall part 23 does not have a function of restricting the lowering of the lifting wall part 25. Therefore, when an external force (such as vibration and impact) is applied to the document conveying device 120, the lifting wall part 25 may swing in the upper-and-lower direction, and depending on a magnitude of the external force, the biasing member 27 may come off. But, in such a case, the lowering restriction parts 43T1, 43T2 are in contact with the protrusions 25B of the lifting wall part 25 to restrict the lowering of the lifting wall part 25, so that the lifting wall part 25 can be prevented from falling off.

The document conveying device 120 according to the present embodiment described above includes the sheet feeding tray 44 on which the document G is placed, the sheet feeding mechanism 31 which feeds the document G placed on the sheet feeding tray 44 in the predetermined sheet feeding direction Z, the discharge tray 43 which is provided below the sheet feeding tray 44 and discharges the document G fed by the sheet feeding mechanism 31, the sheet feeding tray lifting mechanism 33 which lifts and lowers the sheet feeding tray 44, the top plate 21 adjacent to the sheet feeding tray 44 on the downstream side of the sheet feeding direction Z and in contact with the lower surface of the document G to be fed, the fixed wall part 23 provided extending downward from the upstream end portion of the top plate 21 in the sheet feeding direction Z and fixed in position, and the lifting wall part 25 which is provided extending upward from the downstream end portion of the sheet feeding tray 44 in the sheet feeding direction Z and lifted and lowered along the fixed wall part 23 together with the sheet feeding tray 44. The discharge tray 43 is provided with the lowering restriction parts 43T1, 43T2 which restrict the lowering of the lifting wall part 25 by contacting with the lifting wall part 25. According to this configuration, the falling off of the lifting wall part 25 can be prevented.

According to the document conveying device 120 according to the present embodiment, the lowering restriction parts 43T1, 43T2 are provided outside the space through which the document G passes. According to this configuration, it is possible to prevent the lowering restriction parts 43T1, 43T2 from being obstructed from passing the document G.

According to the document conveying device 120 according to the present embodiment, the lowering restriction parts 43T1 and 43T2 do not come into contact with the lifting wall part 25 when the sheet feeding tray 44 is positioned at the lower limit position in the lifting range by the sheet feeding tray lifting mechanism 33. According to this configuration, collision between the lifting wall part 25 and the lowering restriction parts 43T1, 43T2 when the sheet feeding tray 44 reaches the lower limit position can be avoided.

The document conveying device 120 according to the present embodiment includes the protrusions 25B protruding from both the end portions of the lifting wall part 25 in the width direction crossing the sheet feeding direction Z, the engagement parts 44R provided on the sheet feeding tray

44, arranged above the protrusions 25B and engaged with the protrusions 25B, and the biasing member 27 which biases the lifting wall part 25 upward. According to this configuration, by engaging the engagement part 44R with the protrusion 25B from the upper side, the protrusion 25B is pressed against the engagement part 44R by the biasing member 27, so that the lifting wall part 25 can be lifted and lowered together with the sheet feeding tray 44. Further, the lifting wall part 25 and the sheet feeding tray 44 can be assembled by a simple operation of engaging the engagement parts 44R with the protrusions 25B from the upper side. Further, an increase of number of components can be suppressed by integrally molding the protrusions 25B with the lifting wall part 25. Further, an increase of number of components can be suppressed by integrally molding the engagement parts 44R with the sheet feeding tray 44.

According to the document conveying device 120 according to the present embodiment, the fixed wall part 23 includes the convex portions 23T1 to 23T7 provided at intervals along the upstream end portion of the top plate 21 in the sheet feeding direction Z, protruding toward the sheet feeding tray 44 and having the hollow structure with the lower end portion opened, and the concave portions 23U1 to 23O6 provided alternately with the convex portions 23T1 to 23T7, and the lifting wall part 25 includes the convex fitting portions 25T1 to 25T7 fitted inside the convex portions 23T1 to 23T7, and the concave fitting portions 25U1 to 25O6 fitted inside the concave portions 23U1 to 23U6. According to this configuration, since the convex fitting portions 25T1 to 25T7 slide with respect to the convex portions 23T1 to 23T7 and the concave fitting portions 25U1 to 25U6 slide with respect to the concave portions 23U1 to 23U6, the lifting wall part 25 can be lifted and lowered smoothly and in a stable posture.

In the case of this configuration, in the assembling operation, the convex fitting portions 25T1 to 25T7 are inserted into the convex portions 23T1 to 23T7 from the lower side, but if a configuration for restricting the lowering of the lifting wall part 25 may be provided on the fixed wall part 23, the assembling operation becomes complicated. On the other hand, in the present embodiment, since the lowering restriction parts 43T1, 43T2 are provided in the discharge tray 43, the ease of assembly work is not impaired.

Figure 17:
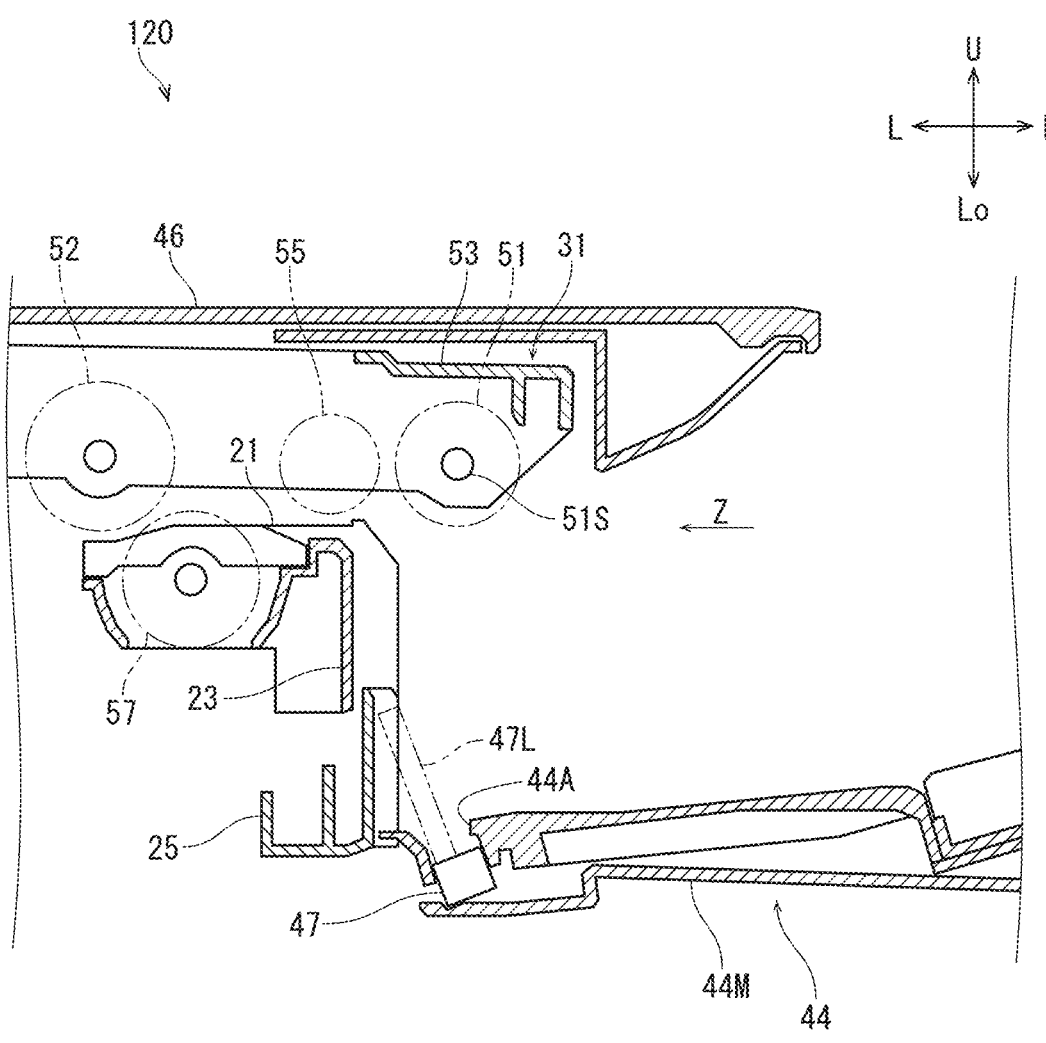
FIG. 17 is a cross-sectional view showing the sheet feeding mechanism, the fixed wall part, the lifting wall part, and the sheet feeding tray.
Figure 18:
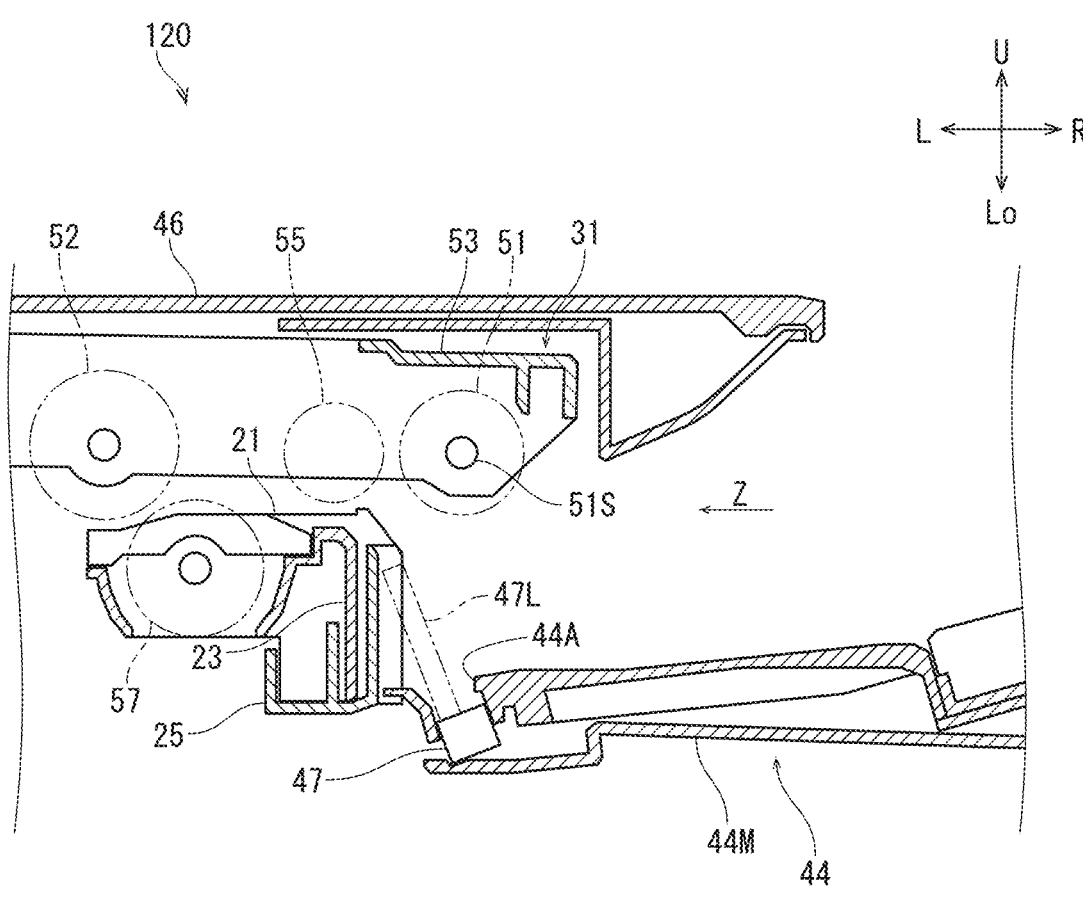
FIG. 18 is a cross-sectional view showing the sheet feeding mechanism, the fixed wall part, the lifting wall part, and the sheet feeding tray.
Figure 19:
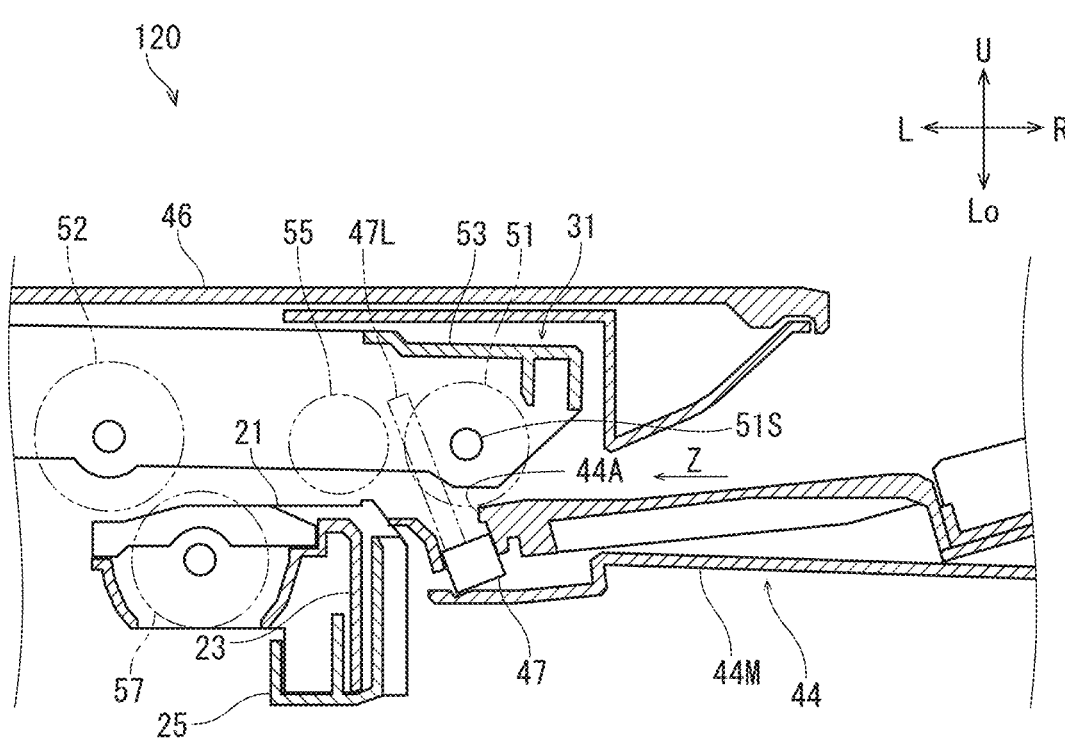
FIG. 19 is a cross-sectional view showing the sheet feeding mechanism, the fixed wall part, the lifting wall part, and the sheet feeding tray.
Figure 20:
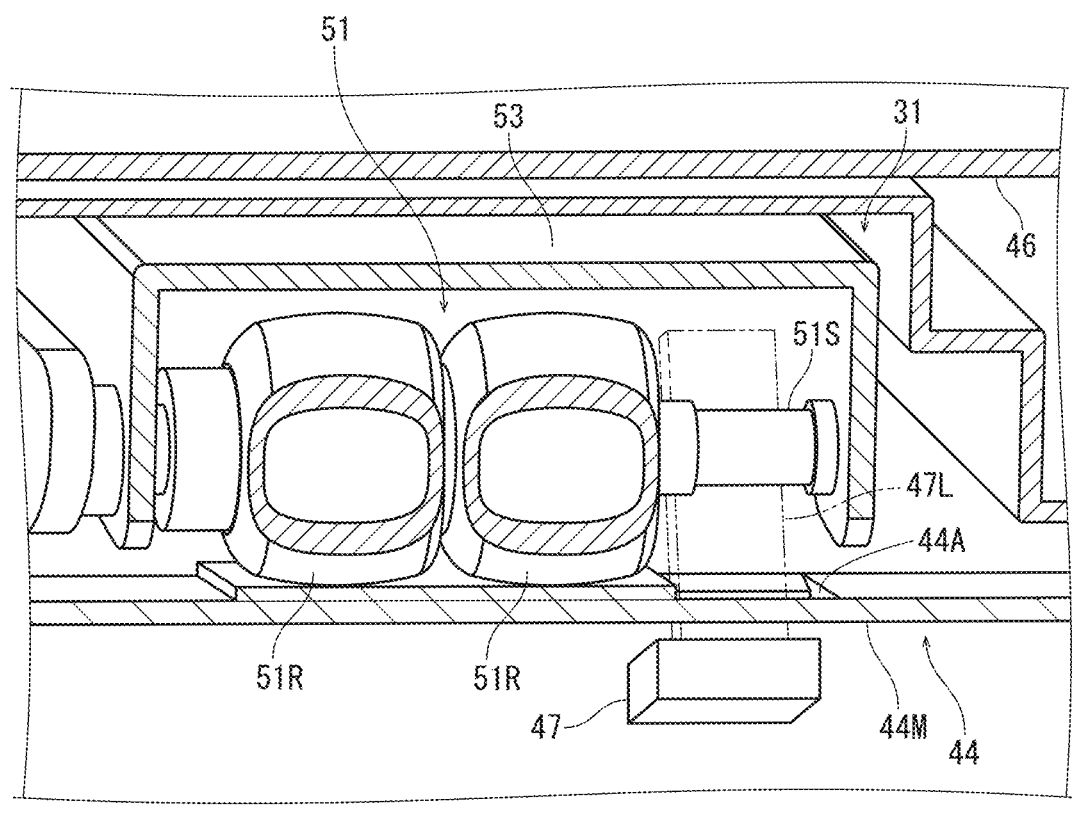
FIG. 20 is a cross-sectional view showing the sheet feeding mechanism and the sheet feeding tray.
Figure 20:
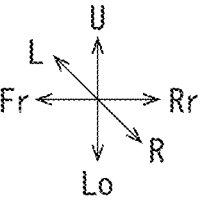

[Reflective Optical Sensor] FIG. 17 to FIG. 19 are cross-sectional views showing the sheet feeding mechanism 31, the fixed wall part 23, the lifting wall part 25, and the sheet feeding tray 44. FIG. 17 shows a state where the lifting wall part 25 and the sheet feeding tray 44 are positioned at the lower limit position. FIG. 18 shows a state in which the lifting wall part 25 is positioned at the upper limit position and the sheet feeding tray 44 is positioned at the intermediate position. FIG. 19 shows a state in which the lifting wall part 25 is positioned at the upper limit position and the sheet feeding tray 44 is positioned at the upper limit position. FIG. 20 is a cross-sectional view showing the sheet feeding mechanism 31 and the sheet feeding tray 44.

A reflective optical sensor 47 includes a light emitting element and a light receiving element (not shown), and detects the document G placed on the sheet feeding tray when the reflected light of the light emitted from the light emitting element is received by the light receiving element. An opening 44A is provided at the downstream end portion of the upper surface of the body portion 44M in the sheet feeding direction Z (see FIG. 7 to FIG. 9, FIG. 17 to FIG. 20). The reflective optical sensor 47 is provided in the opening 44A. The reflective optical sensor 47 is embedded in a position lower than the upper surface of the body portion 44M so as not to prevent the passage of the document G. The light emitted from the light emitting element is emitted through the opening 44A.

The reflective optical sensor 47 needs to detect only the document G in contact with the lifting wall part 25. This is because there is a possibility that the document G cannot be fed even if the pickup roller 51 is driven by the detection of the document G not in contact with the lifting wall part 25. In order to detect only the document G in contact with the lifting wall part 25, it is desirable to install the reflective optical sensor 47 as close as possible to the lifting wall part 25.

However, the pickup roller 51 is provided above the reflective optical sensor 47. If the reflective optical sensor 47 is disposed so as to emit light vertically upward, there is a risk of false detection as the light is reflected by the pickup roller 51. In order to prevent such a false detection, the reflective optical sensor 47 may emit light in a direction not reflected by the pickup roller 51, that is, in a direction other than the vertically upward direction, but if light is emitted in a direction inclined to the upstream side in the sheet feeding direction Z, the document G not in contact with the lifting wall part 25 is detected. Therefore, in the present embodiment, the reflective optical sensor 47 emits light in a direction inclined toward the downstream side in the sheet feeding direction Z from the vertically upward direction (see FIG. 17 to FIG. 20). The reflective optical sensor 47 detects the document G in the detection range 47L. According to this configuration, only the document G in contact with the lifting wall part 25 can be detected, and a false detection due to the reflected light from the pickup roller 51 can be avoided.

The pickup roller 51 includes a shaft 51S and a roller body 51R provided on the shaft 51S. If the light is emitted in a direction inclined downstream in the sheet feeding direction Z from the roller body 51R, an inclination angle of the light with respect to the vertically upward direction becomes large, and the light is reflected by the lifting wall part 25. Therefore, in the present embodiment, the reflective optical sensor 47 is provided at a position different from the roller body 51R in the width direction crossing the sheet feeding direction Z, and emits the light downstream of the shaft 51S in the sheet feeding direction Z (see FIG. 20). According to this configuration, since an inclination angle of the light to the vertically upward direction is small, a reflection of the light on the lifting wall part 25 can be avoided.

The lifting wall part 25 includes a groove 25G along the optical path of the reflective optical sensor 47 (see FIG. 7 to FIG. 9). Specifically, the groove 25G is provided in any one of the concave fitting portions 25U1 to 25U6. As an example, in the present embodiment, the groove 25G is provided in the concave fitting portion 25U4. According to this configuration, a reflection of light on the lifting wall part 25 can be avoided. Further, since the concave fitting portions 25U1 to 25U6 fit into the concave portions 23U1 to 2306 of the fixed wall part 23, there is an advantage that a space in which the groove 25G is formed is easily secured.

In the document conveying device 120, when the reflective optical sensor 47 detects the document G placed on the sheet feeding tray 44, the sheet feeding tray lifting mechanism 33 lifts the sheet feeding tray 44. When the upper surface of the documents G placed on the sheet feeding tray 44 reaches the upper limit position, the light of the sensor 58 is blocked by the light shielding plate 59, and it is detected that the upper surface of the documents G placed on the sheet feeding tray 44 is pressed against the pickup roller 51, and the control part 2 stops the lifting of the sheet feeding tray 44.

As described above, the control part 2 controls the sheet feeding tray lifting mechanism 33 so as to lift the sheet feeding tray 44 as an amount of the documents G placed on the sheeting feeding tray 44 decreases. Specifically, when the placed documents G are fed out one by one by the pickup roller 51, the upper surface of the placed documents G moves downward, so that the light shielding plate 59 does not block the light from the sensor 58. When the light shielding plate 59 does not block the light from the sensor 58 in a state where the reflective optical sensor 47 detects the document G, the sheet feeding tray lifting mechanism 33 lifts the sheet feeding tray 44 by a predetermined amount. When the upper surface of the placed documents G is pressed against the pickup roller 51 and the light shielding plate 59 blocks the light from the sensor 58, the control part 2 stops the lifting of the sheet feeding tray 44.

When the last document of the documents G placed on the sheet feeding tray 44 is fed and the reflective optical sensor 47 no longer detects the document G, the control part 2 controls the sheet feeding tray lifting mechanism 33 to lower the sheet feeding tray 44.

[Discharge Document Sensor] The discharge tray 43 is provided with a discharge document sensor 65 for detecting the document G discharged onto the discharge tray 43 (see FIG. 3). The discharge document sensor 65 may be any type of sensor, for example, a sensor similar to the reflective optical sensor 47. An output signal level of the discharge document sensor 65 changes depending on the presence or absence of the document G on the discharge tray 43. The control part 2 checks the output of the discharge document sensor 65 when the output signal of the reflective optical sensor 47 changes from a level indicating the presence of the document to a level indicating the absence of the document and the operation of lowering the sheet feeding tray 44 is executed.

When the output signal of the discharge document sensor 65 is at the level indicating the presence of the document, the control part 2 lowers the sheet feeding tray 44 from the upper limit position shown in FIG. 9 to the intermediate position shown in FIG. 8. Next, when the user has taken out the document G from the discharge tray 43 and the output signal of the discharge document sensor 65 changes from the level indicating the presence of the document to the level indicating the absence of the document, the control part 2 lowers the sheet feeding tray 44 from the intermediate position to the lower limit position shown in FIG. 7.

A distance between the discharge tray 43 and the sheet feeding tray 44 in the state that the sheet feeding tray 44 is positioned at the intermediate position is set such that the lower surface of the sheet feeding tray 44 does not interfere with the upper surface of the discharged document G even when the documents G of a capacity capable of being placed on the sheet feeding tray 44 is discharged to the discharge tray 43 in the state that the sheet feeding tray 44 is positioned at the lower limit position.

When the user places the document G on the sheet feeding tray 44 and the reflective optical sensor 47 detects the document G in the state where the sheet feeding tray 44 is lowered to the intermediate position or the lower limit position, the control part 2 controls the sheet feeding tray lifting mechanism 33 to lift the sheet feeding tray 44 until the light shielding plate 59 blocks the light from the sensor 58, and starts the feeding the document G by the sheet feeding mechanism 31, as described above. In the case of continuously executing a reading job of a plurality of document bundles, the reading job is automatically executed only by placing the next document bundle on the sheet feeding tray 44 in a state where the reading job of the previous document bundle is finished and the sheet feeding tray 44 is lowered to the intermediate position, so that a plurality of reading jobs can be efficiently executed by a simple operation.

The document conveying device 120 according to the present embodiment described above includes the sheet feeding tray 44 on which the documents G are placed, the sheet feeding mechanism 31 which feeds the document G placed on the sheet feeding tray 44 in the predetermined sheet feeding direction Z, the sheet feeding tray lifting mechanism 33 which lifts and lowers the sheet feeding tray 44, the top plate 21 adjacent to the sheet feeding tray 44 on the downstream side in the sheet feeding direction Z and in contact with the lower surface of the documents G to be fed, the fixed wall part 23 provided extending downward from the upstream end portion of the top plate 21 in the sheet feeding direction Z and fixed in position, the lifting wall part 25 provided extending upward from the downstream end portion of the sheet feeding tray 44 in the sheet feeding direction Z, and lifting and lowering along the fixed wall part 23 together with the sheet feeding tray 44, and the reflective optical sensor 47 which detects the document G placed on the sheet feeding tray 44. The reflective optical sensor 47 emits light in a direction inclined downstream of the sheet feeding direction Z from the vertically upward direction. According to this configuration, only the document G in contact with the lifting wall part 25 can be detected, and a false detection due to the reflected light on the pickup roller 51 can be avoided.

According to the document conveying device 120 according to the present embodiment, the sheet feeding mechanism 31 includes the pickup roller 51 which feeds the document G placed on the sheet feeding tray 44 in the sheet feeding direction Z, the pickup roller 51 has the shaft 51S and the roller body 51R provided on the shaft 51S, and the reflective optical sensor 47 is provided at a position different from the roller body 51R in the width direction crossing the sheet feeding direction Z, and emits light downstream from the shaft 51S in the sheet feeding direction Z. According to this configuration, a reflection of light on the lifting wall part 25 can be avoided.

According to the document conveying device 120 according to the present embodiment, the lifting wall part 25 includes the groove 25G along the optical path of the reflective optical sensor 47. According to this configuration, a reflection of light on the lifting wall part 25 can be avoided.

According to the document conveying device 120 according to the present embodiment, the fixed wall part 23 includes the convex portions 23T1 to 23T7 provided at intervals along the upstream end portion of the top plate 21 in the sheet feeding direction Z, protruding toward the sheet feeding tray 44 and having a hollow structure with the lower end portion opened, and the concave portions 23U1 to 2306 provided alternately with the convex portions 23T1 to 2317, and the lifting wall part 25 includes the convex fitting portions 25T1 to 25T7 fitted inside the convex portions 23T1 to 23T7, and the concave fitting portions 25U1 to 2506 fitted inside the concave portions 23U1 to 2306. The groove 25G is provided in any one of the concave fitting portions 25U1 to 2506. According to this configuration, a space to be the groove 25G can be easily secured.

The document conveying device 120 according to the present embodiment includes the discharge tray 43 which is provided below the sheet feeding tray 44 and discharges the document G fed by the sheet feeding mechanism 31, the discharge document sensor 65 which detects the document G discharged to the discharge tray 43, and the control part 2 which controls the sheet feeding tray lifting mechanism 33. The control part 2 drives the sheet feeding tray lifting mechanism 33 when the output signal of either the reflective optical sensor 47 or the discharge document sensor 65 changes. According to the present embodiment, the user can use the document conveying device 120 without any complicated operation.

The invention claimed is:

1. A document conveying device comprising:
   a sheet feeding tray on which a document is placed;
   a sheet feeding mechanism which feeds the sheet placed on the sheet feeding tray in a predetermined sheet feeding direction;
   a sheet feeding tray lifting mechanism which lifts and lowers the sheet feeding tray;
   a top plate which is adjacent to the sheet feeding tray on a downstream side in the sheet feeding direction and is in contact with a lower surface of the document to be fed;
   a fixed wall part which is provided extending downward from an upstream side end portion of the top plate in the sheet feeding direction and is fixed in position;
   a lifting wall part which is provided extending upward from a downstream side end portion of the sheet feeding tray in the sheet feeding direction, and lifted and lowered along the fixed wall part together with the sheet feeding tray; and
   a reflective optical sensor which detects the document placed on the sheet feeding tray, wherein
   the reflective optical sensor emits light in a direction inclined downstream of the sheet feeding direction from a vertically upward direction, and
   the lifting wall part has a groove along an optical path of the reflective optical sensor.

2. The document conveying device according to claim 1, wherein
   the sheet feeding mechanism includes a pickup roller which feeds the document placed on the sheet feeding tray in the sheet feeding direction,
   the pickup roller has:
   a shaft, and
   a roller body provided around the shaft, and
   the reflective sensor is provided at a position different from the roller body in a width direction crossing the sheet feeding direction and emits the light downstream of the sheet feeding direction from the shaft.

3. The document conveying device according to claim 1, wherein
   the fixed wall part includes:
   a plurality of convex portions which are provided at intervals along the upstream end portion of the top plate in the sheet feeding direction, protrude to the sheet feeding tray, and have a hollow structure with a lower end portion opened; and
   a plurality of concave portions which are alternatively provided with the concave portions,
   the lifting wall part includes:
   a plurality of convex fitting portions which are fitted inside the convex portions; and
   a plurality of concave fitting portions which are fitted inside the concave portions, and
   the groove is provided in any one of the concave fitting portions.

4. A document conveying device comprising:

a sheet feeding tray on which a document is placed;

a sheet feeding mechanism which feeds the sheet placed on the sheet feeding tray in a predetermined sheet feeding direction;

a sheet feeding tray lifting mechanism which lifts and lowers the sheet feeding tray;

a top plate which is adjacent to the sheet feeding tray on a downstream side in the sheet feeding direction and is in contact with a lower surface of the document to be fed;

a fixed wall part which is provided extending downward from an upstream side end portion of the top plate in the sheet feeding direction and is fixed in position;

a lifting wall part which is provided extending upward from a downstream side end portion of the sheet feeding tray in the sheet feeding direction, and lifted and lowered along the fixed wall part together with the sheet feeding tray; and a reflective optical sensor which detects the document placed on the sheet feeding tray, wherein the reflective optical sensor emits light in a direction inclined downstream of the sheet feeding direction from a vertically upward direction, and the document conveying device further comprises:

a discharge tray which is provided below the sheet feeding tray and on which the document fed by the sheet feeding mechanism is discharged;

a discharge document sensor which detects the document discharged on the discharge tray; and a control part which controls the sheet feeding tray lifting mechanism, wherein the control part drives the sheet feeding tray lifting mechanism when an output signal of either the reflective optical sensor or the discharge document sensor changes.

* * * * *